(12) United States Patent
Janky et al.

(10) Patent No.: US 8,515,670 B2
(45) Date of Patent: *Aug. 20, 2013

(54) SYSTEM AND METHOD FOR REFINING A POSITION ESTIMATE OF A LOW EARTH ORBITING SATELLITE

(75) Inventors: James M. Janky, Los Altos, CA (US); Nicholas C. Talbot, Ashburton (AU); Ulrich Vollath, Ismaning (DE); Bruce D. Riter, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/482,603

(22) Filed: May 29, 2012

(65) Prior Publication Data
US 2012/0232724 A1    Sep. 13, 2012

Related U.S. Application Data

(63) Continuation of application No. 12/336,177, filed on Dec. 16, 2008, now Pat. No. 8,260,551.

(60) Provisional application No. 61/010,737, filed on Jan. 10, 2008.

(51) Int. Cl.
*G01C 21/00* (2006.01)

(52) U.S. Cl.
USPC ............... 701/469; 342/357.25; 342/357.43; 342/357.44

(58) Field of Classification Search
USPC ............................................... 701/469
See application file for complete search history.

(56) References Cited

U.S. PATENT DOCUMENTS

| | | | |
|---|---|---|---|
| 4,912,475 A | 3/1990 | Counselman, III | |
| 5,041,833 A | 8/1991 | Weinberg | |
| 5,227,802 A | 7/1993 | Pullman et al. | |
| 5,345,245 A | 9/1994 | Ishikawa et al. | |
| 5,506,588 A | 4/1996 | Diefes et al. | |
| 5,687,084 A | 11/1997 | Wertz | |
| 5,717,404 A | 2/1998 | Malla | |
| 5,812,961 A | 9/1998 | Enge et al. | |
| 5,944,770 A | 8/1999 | Enge et al. | |
| 6,016,117 A | 1/2000 | Nelson, Jr. | |
| 6,089,507 A * | 7/2000 | Parvez et al. | 244/158.8 |
| 6,178,195 B1 | 1/2001 | Durboraw, III et al. | |

(Continued)

OTHER PUBLICATIONS

Langer, John et al., "Orbit Determination and Satellite Navigation", http://www.aero.org/publications/crosslink/summer2002/04.html, (1995).

(Continued)

*Primary Examiner* — Peter Choi
*Assistant Examiner* — Kathleen G Palavecino

(57) ABSTRACT

In a method for refining a position estimate of a low earth orbiting (LEO) satellite a first position estimate of a LEO satellite is obtained with a GNSS receiver on-board the LEO satellite. The first position estimate is communicated to a Virtual Reference Station (VRS) processor. VRS corrections are received at the LEO satellite, the VRS corrections having been calculated for the first position estimate by the VRS processor. The VRS corrections are processed on-board the LEO satellite such that a VRS corrected LEO satellite position estimate of the LEO satellite is generated for the first position estimate.

8 Claims, 13 Drawing Sheets

(56) References Cited

U.S. PATENT DOCUMENTS

| | | |
|---|---|---|
| 6,243,648 B1 | 6/2001 | Kilfeather et al. |
| 6,321,088 B1 | 11/2001 | Dempo |
| 6,373,432 B1 * | 4/2002 | Rabinowitz et al. ..... 342/357.29 |
| 6,411,871 B1 | 6/2002 | Lin |
| 6,424,890 B1 | 7/2002 | Syrjarinne et al. |
| 6,424,914 B1 | 7/2002 | Lin |
| 6,453,237 B1 | 9/2002 | Fuchs et al. |
| 6,463,366 B2 | 10/2002 | Kinashi et al. |
| 6,567,041 B1 | 5/2003 | O'Dell |
| 6,683,563 B2 | 1/2004 | Lee et al. |
| 6,882,908 B2 | 4/2005 | Laurichesse |
| 7,020,555 B1 | 3/2006 | Janky et al. |
| 7,042,392 B2 | 5/2006 | Whelan et al. |
| 7,089,113 B1 | 8/2006 | Janky et al. |
| 7,158,885 B1 | 1/2007 | Janky et al. |
| 7,583,225 B2 | 9/2009 | Cohen et al. |
| 7,840,351 B2 | 11/2010 | Hwang et al. |
| 7,855,678 B2 | 12/2010 | Scherzinger et al. |
| 7,869,811 B2 | 1/2011 | Wirola et al. |
| 2005/0064878 A1 | 3/2005 | O'Meagher |
| 2005/0090265 A1 | 4/2005 | Abraham |
| 2005/0156782 A1 * | 7/2005 | Whelan et al. ........... 342/357.16 |
| 2007/0001900 A1 | 1/2007 | Heppe et al. |
| 2009/0091493 A1 | 4/2009 | Hwang et al. |
| 2009/0093959 A1 | 4/2009 | Scherzinger et al. |
| 2010/0090889 A1 | 4/2010 | Hwang et al. |
| 2010/0169001 A1 | 7/2010 | Scherzinger et al. |
| 2011/0187590 A1 | 8/2011 | Leandro |

OTHER PUBLICATIONS

Kolb, Peter F., et al., "A New Method to Model the Ionosphere Across Local Area Networks", www.trimble.com/survey_wp_scalable.asp, 7.

Vollath, Ulrich et al., "Troposphere: Signal or Noise?", www.trimble.com/survey_wp_scalable.asp, 9.

Landau, Herbert et al., "Virtual Reference Station Systems", www.trimble.com/survey_wp_scalable.asp, 7.

Montenbruck, Oliver et al., "GPS for Microsatellites-Status and Perspectives", *IAA-B6-0504: 6th IAA Symposium on Small Satellites for Earth Observation*, Apr. 23-26, Berlin (2007), 8.

* cited by examiner

SYSTEM AND METHOD FOR REFINING A POSITION ESTIMATE OF A LOW EARTH ORBITING SATELLITE

RELATED U.S. APPLICATION

Continuation

This application claims priority to and is a continuation of the patent application Ser. No. 12/336,177, entitled "SYSTEM AND METHOD FOR REFINING A POSITION ESTIMATE OF A LOW EARTH ORBITING SATELLITE," with filing date of Dec. 16, 2008 now U.S. Pat. No. 8,260,551, which itself claims priority to provisional patent application Ser. No. 61/010,737, entitled "REFINING A POSITION ESTIMATE OF A LOW EARTH ORBITING SATELLITE," with filing date Jan. 10, 2008. Application Ser. No. 12/336, 177 is assigned to the assignee of the present application, and hereby incorporated by reference in its entirety.

BACKGROUND

Low Earth Orbiting (LEO) satellites are satellites that orbit approximately 160-2000 km above the surface of the earth. For a variety of reasons it is useful to know an accurate orbit and/or position of a LEO satellite. However, within the altitude range of a typical orbit, a LEO satellite will often experience atmospheric drag and other forces which can make station keeping and accurate prediction of the orbit and/or position of the LEO satellite difficult.

Using typical methods for orbit and/or position determination/estimation, orbits of LEO satellites at any given time are generally known or knowable to within approximately 20 meters of their actual positions. This is useful information, however for many applications, more accurate information is needed. One mechanism which may be used to improve the knowledge of the actual position and/or orbit of a LEO satellite is the inclusion of a GNSS receiver on the LEO satellite. Using the positioning capabilities of the GNSS receiver, it may be possible to ascertain a position to within approximately 5-15 meters of the actual position of the LEO satellite. However, for many applications this improvement still does not provide sufficiently accurate LEO satellite position and/or orbit information.

BRIEF DESCRIPTION OF THE DRAWINGS

The accompanying drawings, which are incorporated in and form a part of this application, illustrate various embodiments of the presented technology, and together with the description of embodiments, serve to explain the principles of the presented technology. Unless noted, the drawings referred to this description should be understood as not being drawn to scale.

DESCRIPTION OF EMBODIMENTS

Figure 1:
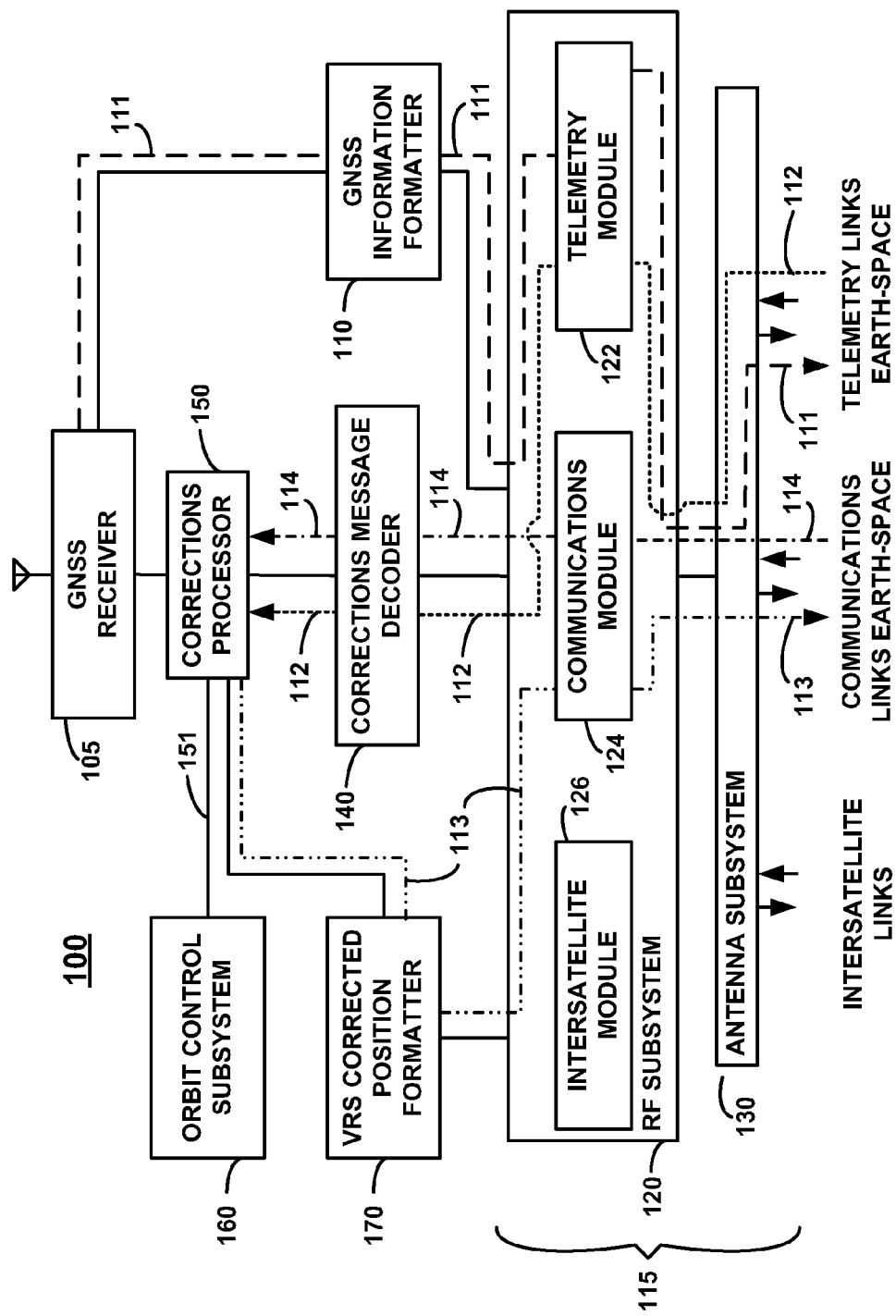
FIG. 1 is a block diagram of a LEO satellite, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "obtaining," "providing," "receiving," "processing," "generating," "transmitting," "utilizing," "conveying," "using," "measuring," "controlling," "communicating," or the like, refer to the actions and processes of a computer system (such as computer system 1000 of FIG. 10), or similar electronic computing device. Computer system 1000 or similar electronic computing device manipulates and transforms data represented as physical (electronic) quantities within the computer system's registers and memories into other data similarly represented as physical quantities within the computer system memories or registers or other such information storage, transmission, or display devices.

The subject matter discussed herein may be described in the general context of computer-executable instructions, such as modules, which are executed or executable by a computer. Generally, these modules include routines, programs, objects, components, data structures, etc., that perform or implement particular tasks or abstract data types.

Overview of Discussion

A discussion of Global Satellite Navigation Systems (GNSSs) and selected positioning techniques will be presented to set the stage for further discussion. An example block diagram of a Low Earth Orbiting (LEO) satellite will then be presented and described. The example LEO satellite is configured with a Global Navigation Satellite System (GNSS) receiver and a corrections processor for processing Virtual Reference Station (VRS) corrections to position estimates which are determined by the GNSS receiver. A master reference station will then be described. The master reference station receives GNSS observables as measured by a plurality of reference receivers. The master reference station utilizes these observables, and in some instances addition information, to determine VRS corrections for a position estimate provided by a GNSS receiver. As described herein, the master reference station determines VRS corrections for a position estimate provided by the GNSS receiver on-board a LEO satellite. Example techniques and equations for processing such VRS corrections will be described in conjunction with the description of the master reference station. The VRS corrections are then provided to the LEO satellite where they are used to determine a VRS corrected position estimate of the LEO satellite (with respect to the GNSS receiver determined position estimate of the LEO satellite). An example block diagram of a LEO satellite position determination system will be described. Operation of components of this system will then be described in greater detail in conjunction with description of an example method for refining a position estimate of a LEO satellite. Discussion will proceed to a description of an example computer system environment and an example GNSS receiver with which, or upon which, embodiments of the subject matter may operate. Discussion will conclude with a description of an example GNSS receiver which may be utilized in embodiments of the subject matter described herein.

Global Navigation Satellite Systems

A Global Navigation Satellite System (GNSS) is a navigation system that makes use of a constellation of satellites orbiting the earth to provide signals to a receiver that estimates its position relative to the earth from those signals. Examples of such satellite systems are the NAVSTAR Global Positioning System (GPS) deployed and maintained by the United States, the GLObal NAvigation Satellite System (GLONASS) deployed by the Soviet Union and maintained by the Russian Federation, and the GALILEO system currently being deployed by the European Union (EU).

Each GPS satellite transmits continuously using two radio frequencies in the L-band, referred to as L1 and L2, at respective frequencies of 1575.41 MHz and 1227.60 MHz. Two signals are transmitted on L1, one for civil users and the other for users authorized by the Unites States Department of Defense (DoD). One signal is transmitted on L2, intended only for DoD-authorized users. Each GPS signal has a carrier at the L1 and L2 frequencies, a pseudo-random number (PRN) code, and satellite navigation data. Two different PRN codes are transmitted by each satellite: a coarse acquisition (C/A) code and a precision (P/Y) code which is encrypted for use by authorized users. A GPS receiver designed for precision positioning contains multiple channels, each of which can track the signals on both L1 and L2 frequencies from a GPS satellite in view above the horizon at the receiver antenna, and from these computes the observables for that satellite comprising the L1 pseudorange, possibly the L2 pseudorange and the coherent L1 and L2 carrier phases. Coherent phase tracking implies that the carrier phases from two channels assigned to the same satellite and frequency will differ only by an integer number of cycles.

Each GLONASS satellite transmits continuously using two radio frequency bands in the L-band, also referred to as L1 and L2. Each satellite transmits on one of multiple frequencies within the L1 and L2 bands respectively centered at frequencies of 1602.0 MHz and 1246.0 MHz. The code and carrier signal structure is similar to that of NAVSTAR. A GNSS receiver designed for precision positioning contains multiple channels each of which can track the signals from both GPS and GLONASS satellites on their respective L1 and L2 frequencies, and generate pseudorange and carrier phase observables from these. Future generations of GNSS receivers will include the ability to track signals from all deployed GNSSs.

Virtual Reference Stations

To achieve very accurate positioning (to several centimeters or less) of a terrestrial mobile platform, relative or differential positioning methods are commonly employed. These methods use a GNSS reference receiver located at a known position, in addition to the data from a GNSS receiver on the mobile platform, to compute the estimated position of the mobile platform relative to the reference receiver. The most accurate known method uses relative GNSS carrier phase interferometry between the GNSS rover receiver and GNSS reference receiver antennas plus resolution of integer wavelength ambiguities in the differential phases to achieve centimeter-level positioning accuracies. These differential GNSS methods are predicated on the near exact correlation of several common errors in the rover and reference observables. They include ionosphere and troposphere signal delay errors, satellite orbit and clock errors, and receiver clock errors.

When the baseline length between the mobile platform and the reference receiver does not exceed 10 kilometers, which is normally considered a short baseline condition, the ionosphere and troposphere signal delay errors in the observables from the rover and reference receivers are almost exactly the same. These atmospheric delay errors therefore cancel in the rover-reference differential GNSS observables, and the carrier phase ambiguity resolution process required for achieving centimeter-level relative positioning accuracy is not perturbed by them. If the baseline length increases beyond 10 kilometers (considered a long baseline condition), these errors at the rover and reference receiver antennas become increasingly different, so that their presence in the rover-reference differential GNSS observables and their influence on the ambiguity resolution process increases. Ambiguity resolution on single rover-reference receiver baselines beyond 10 kilometers becomes increasingly unreliable. This attribute limits the precise resolution of a mobile platform with respect to a single reference receiver, and essentially makes it unusable on a mobile mapping platform that covers large distances as part of its mission, such as an aircraft.

A network GNSS method computes the estimated position of a rover receiver using reference observables from three or more reference receivers that approximately surround the rover receiver trajectory. This implies that the rover receiver trajectory is mostly contained by a closed polygon whose vertices are the reference receiver antennas. The rover receiver can move a few kilometers outside this polygon without significant loss of positioning accuracy. A network GNSS algorithm calibrates the ionosphere and troposphere signal delays at each reference receiver position and then interpolates and possibly extrapolates these to the rover position to achieve better signal delay cancellation on long baselines than could be had with a single reference receiver. Various methods of signal processing can be used, however they all yield essentially the same performance improvement on long baselines. As with single baseline GNSS, previously known GNSS solutions are still inadequate for a mobile platform that covers large distances as part of its mission, such as an aircraft or a LEO satellite.

Kinematic ambiguity resolution (KAR) satellite navigation is a technique used in numerous applications requiring high position accuracy. KAR is based on the use of carrier phase measurements of satellite positioning system signals, where a single reference station provides the real-time corrections with high accuracy. KAR combines the L1 and L2 carrier phases from the rover and reference receivers so as to establish a relative phase interferometry position of the rover antenna with respect to the reference antenna. A coherent L1 or L2 carrier phase observable can be represented as a precise pseudorange scaled by the carrier wavelength and biased by an integer number of unknown cycles known as cycle ambiguities. Differential combinations of carrier phases from the rover and reference receivers result in the cancellation of all common mode range errors except the integer ambiguities. An ambiguity resolution algorithm uses redundant carrier phase observables from the rover and reference receivers, and the known reference antenna position, to estimate and thereby resolve these ambiguities.

Once the integer cycle ambiguities are known, the rover receiver can compute its antenna position with accuracies generally on the order of a few centimeters, provided that the rover and reference antennas are not separated by more than 10 kilometers. This method of precise positioning performed in real-time is commonly referred to as real-time kinematic (RTK) positioning.

The reason for the rover-reference separation constraint is that KAR positioning relies on near exact correlation of atmospheric signal delay errors between the rover and reference receiver observables, so that they cancel in the rover-reference observables combinations (for example, differences between rover and reference observables per satellite). The largest error in carrier-phase positioning solutions is introduced by the ionosphere, a layer of charged gases surrounding the earth. When the signals radiated from the satellites penetrate the ionosphere on their way to the ground-based receivers, they experience delays in their signal travel times and shifts in their carrier phases. A second significant source of error is the troposphere delay. When the signals radiated from the satellites penetrate the troposphere on their way to the ground-based receivers, they experience delays in their signal travel times that are dependent on the temperature, pressure and humidity of the atmosphere along the signal paths. Fast and reliable positioning requires good models of the spatio-temporal correlations of the ionosphere and troposphere to correct for these non-geometric influences.

When the rover-reference separation exceeds 10 kilometers, as is the typical case with a LEO satellite GNSS rover receiver, the atmospheric delay errors become decorrelated and do not cancel exactly. The residual errors can now interfere with the ambiguity resolution process and thereby make correct ambiguity resolution and precise positioning less reliable.

The rover-reference separation constraint has made KAR positioning with a single reference receiver unsuitable for certain mobile positioning applications where the mission of the mobile platform will typically exceed this constraint. One solution is to set up multiple reference receivers along the mobile platform's path so that at least one reference receiver falls within a 10 km radius of the mobile platform's estimated position. This approach can become time-consuming and expensive if the survey mobile platform covers a large project area. It can also be impractical or impossible if the mobile platform is operated at a high altitude, such as a LEO satellite is.

Network GNSS methods using multiple reference stations of known location allow correction terms to be extracted from the signal measurements. Those corrections can be interpolated to all locations within the network. Network KAR is a technique that can achieve centimeter-level positioning accuracy on large project areas using a network of reference GNSS receivers. This technique operated in real-time is commonly referred to as network RTK. The network KAR algorithm combines the pseudorange and carrier phase observables from the reference receivers as well as their known positions to compute calibrated spatial and temporal models of the ionosphere and troposphere signal delays over the project area. These calibrated models provide corrections to the observables from the rover receiver, so that the rover receiver can perform reliable ambiguity resolution on combinations of carrier phase observables from the rover and some or all reference receivers. The number of reference receivers required to instrument a large project area is significantly less than what would be required to compute reliable single baseline KAR solutions at any point in the project area. See, for example, U.S. Pat. No. 5,477,458, "Network for Carrier Phase Differential GPS Corrections," and U.S. Pat. No. 5,899,957, "Carrier Phase Differential GPS Corrections Network". See also Liwen Dai et al., "Comparison of Interpolation Algorithms in Network-Based GPS Techniques," Journal of the Institute of Navigation, Vol. 50, No. 4 (Winter 2003-2004) for a comparison of different network GNSS implementations and comparisons of their respective performances.

A virtual reference station (VRS) network method is a particular implementation of a network GNSS method that is characterized by the method by which it computes corrective data for the purpose of rover position accuracy improvement. A VRS network method comprises a VRS corrections generator and a single-baseline differential GNSS position generator such as a GNSS receiver with differential GNSS capability. The VRS corrections generator has as input data the pseudorange and carrier phase observables on two or more frequencies from N reference receivers, each tracking signals from M GNSS satellites. The VRS corrections generator outputs a single set of M pseudorange and carrier phase observables that appear to originate from a virtual reference receiver at a specified position (hereafter called the VRS position) within the boundaries of the network defined by a polygon (or projected polygon) having all or some of the N reference receivers as vertices. The dominant observables errors comprising a receiver clock error, satellite clock errors, ionosphere and troposphere signal delay errors and noise all appear to be consistent with the VRS position. The single-baseline differential GNSS position generator implements a single-baseline differential GNSS position algorithm, of which numerous examples have been described in the literature. B. Hofmann-Wellenhof et al., *Global Positioning System: Theory and Practice, 5th Edition,* 2001 (hereinafter "Hofmann-Wellenhof [2001]"), gives comprehensive descriptions of different methods of differential GNSS position computation, ranging in accuracies from one meter to a few centimeters. The single-baseline differential GNSS position algorithm typically computes differences between the rover and reference receiver observables to cancel atmospheric delay errors and other common mode errors such as orbital and satellite clock errors. The VRS position is usually specified to be close to or the same as the roving receiver's estimated position so that the actual atmospheric errors in the roving receiver's observables approximately cancel the estimated atmospheric errors in the VRS observables in the rover-reference observables differences.

The VRS corrections generator computes the synthetic observables at each sampling epoch (typically once per second) from the geometric ranges between the VRS position and the M satellite positions as computed using well-known algorithms such as given in "Naystar GPS Space Segment/Navigation User Interface," ICD-GPS-200C-005R1, 14 Jan. 2003 (hereinafter "ICD-GPS-200"). It estimates the typical pseudorange and phase errors comprising receiver clock error, satellite clock errors, ionospheric and tropospheric signal delay errors and noise, applicable at the VRS position from the N sets of M observables generated by the reference receivers, and adds these to the synthetic observables.

A network RTK system operated in real time requires each GNSS reference receiver to transmit its observables to a network server computer that computes and transmits the corrections and other relevant data to the GNSS rover receiver. The GNSS reference receivers, plus hardware to assemble and broadcast observables, are typically designed for this purpose and are installed specifically for the purpose of implementing the network. Consequently, those receivers are called dedicated (network) reference receivers.

An example of a VRS network is designed and manufactured by Trimble Navigation Limited, of Sunnyvale, Calif. The VRS network as delivered by Trimble includes a number of dedicated reference stations, a VRS server, multiple server-reference receiver bi-directional communication channels, and multiple server-rover bi-directional data communication channels. Each server-rover bi-directional communication channel serves one rover. The reference stations provide their observables to the VRS server via the server-reference receiver bi-directional communication channels. These channels can be implemented by a public network such as the Internet. The bi-directional server-rover communication channels can be radio modems or cellular telephone links, depending on the location of the server with respect to the rover.

The VRS server combines the observables from the dedicated reference receivers to compute a set of synthetic observables at the VRS position and broadcasts these plus the VRS position in a standard differential GNSS (DGNSS) message format, such as one of the RTCM (Radio Technical Commission for Maritime Services) formats, an RTCA (Radio Technical Commission for Aeronautics) format or a proprietary format such as the CMR (Compact Measurement Report) or CMR+ format which are messaging system communication formats employed by Trimble Navigation Limited. Descriptions for numerous of such formats are widely available. For example, RTCM Standard 10403.1 for DGNSS Services—Version 3, published Oct. 26, 2006 (and Amendment 2 to the same, published Aug. 31, 2007) is available from the Radio Technical Commission for Maritime Services, 1800 N. Kent St., Suite 1060, Arlington, Va. 22209. The synthetic observables are the observables that a reference receiver located at the VRS position would measure. The VRS position is selected to be close to the rover's estimated position so that the rover-VRS separation is less than a maximum separation considered acceptable for the application. Consequently, the rover receiver must periodically transmit its approximate position to the VRS server. The main reason for this particular implementation of a real-time network RTK system is compatibility with RTK survey GNSS receivers that are designed to operate with a single reference receiver.

Descriptions of the VRS technique are provided in U.S. Pat. No. 6,324,473 of (hereinafter "Eschenbach") (see particularly col. 7, line 21 et seq.) and U.S. Patent application publication no. 2005/0064878, of B. O'Meagher (hereinafter "O'Meagher"), which are assigned to Trimble Navigation Limited; and in H. Landau et al., *Virtual Reference Stations versus Broadcast Solutions in Network RTK*, GNSS 2003 Proceedings, Graz, Austria (2003); each of which is incorporated herein by reference.

The term "VRS", as used henceforth in this document, is used as shorthand to refer to any system or technique which has the characteristics and functionality of VRS described or referenced herein and is not necessarily limited to a system from Trimble Navigation Ltd. Hence, the term "VRS" is used in this document merely to facilitate description and is used without derogation to any trademark rights of Trimble Navigation Ltd. or any subsidiary thereof or other related entity.

Though such VRS techniques have been used terrestrially for providing corrections to users in aircraft, on the water, or on the surface of the earth, herein, methods and systems are described which enable the use of such techniques extraterrestrially, to refine an estimated position of a LEO satellite. The techniques introduced here use a network of GNSS reference receivers that terrestrially surround the mission area (orbital track) of a LEO satellite, to overcome the limitation on baseline length. These reference receivers can be a combination of dedicated reference receivers installed by the user and/or permanent receivers that are part of a network installed by some other agency, such as a local or national government for some other purpose such as earthquake detection or atmospheric research. Examples of such permanent receiver networks are the Continuously Operating Reference System (CORS) and the International GNSS System (IGS). Typically these permanent receivers provide access and data download via the Internet to the general public or to service subscribers.

Example LEO Satellite

FIG. 1 shows an example block diagram of vehicle subsystems in a LEO satellite 100, in accordance with an embodiment. LEO satellite 100 includes GNSS receiver 105, GNSS information formatter 110, communications subsystem 115, corrections message decoder 140, corrections processor 150, orbit control subsystem 160, and VRS corrected position formatter 170. Communications subsystem 115 manages transmission and receipt of a variety of messages via appropriate channels/frequencies. In one embodiment, communications subsystem 115 includes radio frequency (RF) subsystem 120, antenna subsystem 130 which it uses in the performance of on-board processing (OBP) of signals. In some embodiments, not all of these subsystems may be included, and/or such subsystems may be arranged differently than shown or else have their functions consolidated into the functioning of another subsystem or component of LEO satellite 100. Further, it is understood and appreciated that a typical LEO satellite includes additional components and/or subsystems beyond those shown in FIG. 1. However, for purposes of clarity, only portions of a LEO satellite pertinent to the present discussion are described.

LEO Satellite Operation

In brief, GNSS receiver 105 determines an estimated position, often referred to herein as a "first position estimate," which is an approximate position of LEO satellite 100. This first position estimate is formatted into a GNSS information message by GNSS information formatter 110. The GNSS information message is then provided to communications subsystem 115. In communications subsystem 115, RF subsystem 120 modulates the GNSS information message for transmission and antenna subsystem 130 transmits the modulated message. This processing and communicating of the first position estimate is illustrated, in one embodiment, by communications path 111. This GNSS information message is received terrestrially, such as at a LEO satellite ground control station. The GNSS information message and/or its contents are provided to a master reference station, such as master reference station 200 (shown in FIG. 2 and FIG. 8A). The master reference station includes a VRS processor which generates VRS corrections for the first position estimate.

These VRS corrections are then formatted into a VRS corrections message and transmitted back to LEO satellite 100, where in communications subsystem 115 they are received by antenna subsystem 130 and demodulated by an appropriate portion of RF subsystem 120. The VRS corrections message is then decoded by corrections message decoder 140. Typically the VRS corrections take the form of synthetic observables which have been calculated for the first position estimate provided by GNSS receiver 105, such that numerous errors are removed or minimized in comparison to the actual observables measured by GNSS receiver 105. However the VRS corrections may be supplied as corrections to be applied to the observables collected by GNSS receiver 105. The decoded VRS corrections are then provided to corrections processor 150. In one embodiment, this receipt, demodulating, decoding, and processing of VRS corrections is illustrated by communications path 112. In another embodiment, this receipt, demodulating, decoding, and processing of VRS corrections is illustrated by communications path 114. Although not illustrated, in one embodiment, such VRS corrections can also be received over an intersatellite link, decoded by intersatellite module 126, and provided to corrections message decoder 140.

Corrections processor 150 processes the VRS corrections decoded by corrections message decoder 140. As a result of this processing a refined position estimate or VRS corrected LEO satellite position estimate of LEO satellite 100 is produced on-board LEO satellite 100. This VRS correction LEO satellite position estimate is more accurate than the first position estimate originally determined by GNSS receiver 105. For example, in one embodiment, the VRS corrected LEO satellite position estimate is accurate to the sub-meter level, such as to within a decimeter of the actual position of LEO satellite 100 at the time/location of the determination of the approximate position by GNSS receiver 105.

In one embodiment, the VRS corrected LEO satellite position estimate is provided to orbit control subsystem 160, for example via communicative coupling 151, as an input for use in orbit control of LEO satellite 100.

In one embodiment, the VRS corrected LEO satellite position estimate is provided to VRS corrected position formatter 170 which formats the VRS corrected LEO satellite position estimate into a VRS corrected position message. In one embodiment, the formatting includes providing a time tag in the VRS corrected position message, wherein the time tag indicates the time that an included VRS corrected position estimate is associated with. Such a time tag allows the VRS corrected position message, which is received in near real time, to be properly associated by a recipient with a particular position estimate determined by the recipient at the time represented by the time tag. This VRS corrected position message is then communicatively coupled to communications subsystem 115 where it is modulated by one or more portions of RF subsystem 120 and transmitted by antenna subsystem 130. For example, the VRS corrected LEO satellite position estimate embodied in the VRS corrected position message may be transmitted to another satellite, to a space borne or terrestrial GNSS receiver that is equipped with a LEO satellite receiver, to a control station, and/or to another location or entity. In one embodiment, this formatting and communicating of a VRS corrected LEO satellite position estimate is illustrated by communications path 113.

An "orbital telestation" containing a GPS receiver is described by U.S. Pat. No. 5,793,813, entitled "Communication System Employing Space-based and Terrestrial Telecommunications Equipment", to Robert S. Cleave (hereafter "Cleave"), which is incorporated herein by reference. Although the Cleave patent outlines the concept of a spacecraft with an on-board GPS and the ability to communicate its GPS location via the Globalstar LEO satellite network, this system of Cleave is not used the manner described herein. A LEO satellite, and cellular communication system comprised of such LEO satellites, which uses GPS data to self navigate is described by European Patent Application 0 365 885 A2, entitled "Satellite cellular telephone and data communication system," to Bary Robert Bertinger et al. (hereafter "Bertiger"), which is incorporated herein by reference in its entirety. The Bertiger application describes LEO satellites, in a system much like the present Iridium satellite network, which can communicate with one another and with one or more terrestrial users. Though the Bertiger application describes a LEO satellite which uses GPS to self navigate, this system described by Bertiger is not used in the manner described herein. It is appreciated that in one embodiment, LEO satellite 100 of FIG. 1 operates to communicate its position to a VRS processor of a master reference station via a LEO satellite communications network such as Globalstar or Iridium. Likewise, in one embodiment, LEO satellite 100 of FIG. 1 receives a VRS corrections message (generated by the master reference station) which is communicated to it via a LEO satellite communications network such as Globalstar or Iridium.

LEO Satellite Structure

GNSS receiver 105 is physically coupled with LEO satellite 100, receives signals including broadcast observables from a plurality of navigation satellites, and determines a first position estimate based upon information provided in the signals. The first position estimate is indicative of an approximate position of LEO satellite 100. This approximate position is typically accurate to within approximately +/−5 to 15 meters, depending on a number of factors. The first position estimate determined by GNSS receiver 105 is occasionally referred to herein as "an approximate position" of LEO satellite 100 to differentiate it from the more accurate VRS corrected LEO satellite position estimate of LEO satellite 100 which, in one embodiment, is refined from the approximate position through the processing of VRS corrections associated with the approximate position. The first position estimate determined by GNSS receiver 105 is expressed as a three-dimensional coordinate referenced to a coordinate system. One example of a coordinate system in which the three-dimension coordinate is expressed in a terrestrial reference frame that utilizes the center of the Earth as an origin (e.g., World Geodetic System model WGS84). In another embodiment the three dimensional position is expressed as a latitude, longitude, and altitude relative to the surface of the Earth. It is appreciated that in some embodiments, GNSS receiver 105 may perform other functions, such as being a portion of an attitude determination system used for ascertaining an attitude of LEO satellite 100.

In one embodiment, GNSS receiver 105 is a GPS receiver configured only for receiving and interpreting signals from GPS satellites. In one embodiment, GNSS receiver 105 receives and interprets signals from a plurality of different types of navigation satellite systems, such as from some combination of GPS, GLONASS, Compass, Galileo, and the like. Position estimates, such as the first position estimate, which are determined by GNSS receiver 105 are provided to GNSS information formatter 110. In one embodiment, one or more raw observables measured by GNSS receiver 105 are also provided to GNSS information formatter 110. GNSS receiver 105 is also coupled with corrections processor 150, to provide position estimates and/or measured GNSS observables.

GNSS information formatter 110 receives a position estimate, such as the first position estimate, which has been determined by GNSS receiver 105 and then formats that position estimate into a GNSS information message which can be communicated to a VRS processor by communications subsystem 115. In one embodiment, such formatting includes encoding and/or compressing the first position estimate provided by GNSS receiver 105. In one embodiment, such formatting comprises including a time tag associated with the time at which the position estimate being formatted into the GNSS information message was determined. In some embodiments, such formatting also comprises including one or more of the observables measured by GNSS receiver 105 into the GNSS information message, the observables having been measured at the same time as the determination of the position estimate and/or used in the determination of the position estimate.

GNSS information formatter 110, in one embodiment, compiles information from GNSS receiver 105 into a GNSS information message which includes one or more of: an identifier associated with LEO satellite 100; a time measurement from GNSS receiver 105 for a time T(i), which may be based upon GPS time, GLONASS time or some other time format; a calculated uncorrected initial position fix at the time T(i) which is based on raw observables received from GNSS satellites by LEO satellite 100; raw observables (pseudoranges) from GNSS satellites in view of LEO satellite 100 (along with corresponding GNSS satellite identification information) which were used to determine the position fix at time T(i); and a calculated position fix at time T(i) which has been calculated using uplinked VRS corrections for time T(i). It is appreciated that that numerous GNSS information messages can be formatted with different combinations of the above information and/or additional information, depending upon the type of information available. For example, in one instance, a GNSS information message includes an uncorrected position fix for time T(i), but not a VRS corrected position fix for time T(i). Later, after uplinked corrections for time T(i) are received at LEO satellite 100, GNSS information formatter 110 formats a follow up GNSS information message for time T(i) which includes the VRS corrected position of LEO satellite 100 at time T(i) and may or may not include the uncorrected initial position fix at time T(i). One reason for including a VRS corrected position of LEO satellite 100 in a GNSS information message is to allow a ground station to determine if there is any discrepancy between ground and space based VRS correction calculations.

In some embodiments, information received by GNSS receiver 105 and/or calculated by LEO satellite 100 is used or useable by a VRS corrections processor to calculate VRS corrections. As such GNSS information formatter 110, in one embodiment, formats GNSS information messages according to a protocol used for transmitting information from a reference station to a VRS corrections processor. Such formatting can be used, for consistency, whether or not the information in the GNSS information message will be used as reference station information. Several formats for sending information from a reference station to a VRS processor are known. For example, in one embodiment, GNSS information formatter 110 formats GNSS information messages according to one of the message formats described by RTCM Standard 10403.1 (dated October 2006) and amended Aug. 31, 2007 (Amendment 2). Although messages from LEO satellites are not specifically provided for by RTCM standard 10403.1, in one embodiment, combinations of the above recited information (and other information) can be compiled into an RTCM format message by incorporating a unique identifier associated with LEO satellite 100 into the Reference Station Identification data field of an RTCM message format. In another embodiment, GNSS information formatter 110 uses a proprietary format, such as the CMR or CMR+ format of Trimble Navigation Limited.

Communications subsystem 115 includes Radio Frequency (RF) subsystem 120 and antenna subsystem 130. Communications subsystem 115 manages and conducts incoming and outgoing communications from LEO satellite 100. These communications include incoming and outgoing telemetry signals, communications signals, and intersatellite signals. As part of the management function, communications subsystem 115 directs incoming communications to appropriate locations within LEO satellite 100 and to desired entities outside of LEO satellite 100.

In one embodiment, communications subsystem 115 also performs OBP of incoming and outgoing messages, including routing/communicating of messages to appropriate destinations. Through OBP communications subsystem 115 provides flexibility for communicating a message directly to a desired entity or indirectly to a desired entity. Among other instances, indirect communication may be desirable when LEO satellite 100 is out of direct communication range with an entity such as a LEO ground control station or terrestrial LEO receiver. For example, as a function of such routing, a telemetry message may be communicated directly from LEO satellite 100 to a LEO control station via a telemetry channel. As another function of such routing, the same telemetry message can be communicated to another satellite with instructions that it be downlinked to a LEO control station. Such message routing can also be performed in a similar manner for other messages. For instance, LEO satellite 100 can communicate a message directly to a terrestrial LEO receiver via a communications channel or indirectly to the terrestrial LEO receiver by sending the message to another satellite with instructions that it be downlinked to the terrestrial LEO receiver on a communications channel.

RF subsystem 120 modulates messages to be transmitted from antenna subsystem 130 and demodulates messages that are received by antenna subsystem 130. This includes modulating a message for transmission at a particular frequency or via a particular antenna of antenna subsystem 130. In one embodiment, RF subsystem 120 includes a telemetry module 122, a communications module 124, and/or an in intersatellite module 126. For example, telemetry module 122 receives and demodulates telemetry messages uplinked to LEO satellite 100 on a telemetry channel and modulates telemetry messages being downlinked from LEO satellite 100 on a telemetry channel. Likewise, communications module 124 receives and demodulates communications messages uplinked to LEO satellite 100 on a communications channel and modulates communications messages being downlinked from LEO satellite 100 on a communications channel. Similarly, intersatellite module 126 receives and demodulates intersatellite messages crosslinked to LEO satellite 100 on an intersatellite channel and modulates intersatellite messages being transmitted from LEO satellite 100 to another satellite on an intersatellite channel. In practice, telemetry messages, communication messages, and intersatellite messages are transmitted on channels which fall in specific ranges of frequencies that have been set aside by governmental or international agencies or else are typically or customarily used for specific purposes of intersatellite transmissions, telemetry transmissions, and satellite payload/commercial communications transmissions.

It is appreciated that in some embodiments, one or more of modules 122, 124, and 126 may operate to translate the frequency of a received message such that it may be immediately retransmitted in a bent-pipe fashion. For example, a message received by communications module 124 on an inbound communications channel can be translated/modulated to/upon an outbound frequency by communications module 124 for retransmission by antenna subsystem 130 on an outbound communications channel. Similarly, separate modules of RF subsystem 120 can communicate with one another to retransmit a received message in a bent-pipe fashion. For example, telemetry module 122 can receive a message on a telemetry channel, demodulate it, and provide it to communications module 124, which will translate/modulate it to/upon an outbound communications frequency for transmission by antenna subsystem 130 on an outbound communications channel.

Antenna subsystem 130 includes one or more antennas for transmitting and receiving messages. For example, in one embodiment, antenna subsystem 130 includes antennas for sending and receiving messages on earth/space telemetry uplink channels and downlink channels, earth/space communications uplink channels and downlink channels, and or intersatellite crosslink inbound and outbound channels. For example, in one embodiment, antenna subsystem 130 operates to transmit a GNSS information message which has been modulated for transmission on a telemetry downlink channel or communications downlink channel. In another embodiment, antenna subsystem 130 operates to transmit a VRS corrected position message (described below) which has been modulated for transmission on a communications downlink channel or an outbound intersatellite crosslink channel. With respect to receiving information, in one embodiment, antenna subsystem 130 operates to receive a VRS corrections message which has been transmitted to LEO satellite 100 on a telemetry uplink channel, an intersatellite crosslink channel, or on a communications uplink channel.

Corrections message decoder 140 operates to decode VRS corrections which are packaged in a received VRS corrections message that has been demodulated by RF subsystem 120 or one of its modules (122, 124, 126). This decoding can comprise decrypting, uncompressing, or other actions as required to extract VRS corrections from a demodulated VRS corrections message.

Corrections processor 150 operates to process VRS corrections that are received in a VRS corrections message associated with a particular position estimate (such as the first position estimate) that has been determined by GNSS receiver 105. The VRS corrections comprise synthetic observables which have been calculated for the position estimate which has been determined by GNSS receiver 105. The VRS corrections are calculated for the time at which the position estimate was made. Depending upon the format of the VRS corrections, the corrections can be used to replace or adjust observables measured by GNSS receiver 105. In either case, the object is to remove or reduce the errors embodied in the observables measured by GNSS receiver 105 and subsequently used to determine the approximate position of LEO satellite 100. By removing and/or reducing the errors of these observables, corrections processor 150 can then recalculate the position to get a more accurate outcome. This recalculated position is referred to as the VRS corrected LEO satellite position estimate of LEO satellite 100, and represents a refinement from the original position estimate. Whereas the original satellite position estimate, such as the first position estimate, was likely accurate to within +/−5 to 15 meters of the actual position of LEO satellite 100, a VRS corrected LEO satellite position estimate has sub-meter accuracy, such as to within +/− a decimeter of the actual location of LEO satellite 100 at the time/location the original satellite position estimate was determined.

Orbit control subsystem 160 operates to control the three-dimensional positioning of LEO satellite 100 in an orbital plane. In one embodiment, corrections processor 150 provides the VRS corrected LEO satellite position estimate as an input to orbit control subsystem 160 for use in orbit control subsystem of LEO satellite 100. In one embodiment, orbit control subsystem 160 uses the highly accurate VRS corrected LEO satellite position estimate to make decisions and take actions regarding manipulation of the orbit of LEO satellite 100. For example, if it is determined that LEO satellite 100 is in an acceptable position with respect to a desired orbit, orbit control subsystem 160 will make no corrections. If it is determined the LEO satellite 100 is not in an acceptable position with respect to a desired orbit, orbit control subsystem 160 can purposely take no action or actively operate thrusters, reaction wheels, or other mechanisms to adjust the orbit of LEO satellite 100. When in receipt of a constant and sequential stream of VRS corrected LEO satellite position estimates for LEO satellite 100, orbit control subsystem 160 receives feedback in response to orbit control actions, and can thus perform highly accurate orbital changes such as orbital maneuvering and/or orbital station keeping.

VRS corrected position formatter 170 receives a VRS corrected LEO satellite position estimate which has been calculated by corrections processor 150 and formats this VRS corrected LEO satellite position estimate into a VRS corrected position message which can be transmitted by RF subsystem 120 and antenna subsystem 130. Such formatting can include encoding and/or compressing the VRS corrected LEO satellite position estimate. In one embodiment, the VRS corrected position message is then provided to RF subsystem 120 which modulates it onto a desired outbound channel and then provides the modulated VRS corrected message to antenna subsystem 130. Antenna subsystem 130 then transmits the modulated VRS corrected position message for receipt by a GNSS rover receiver, control station, another satellite, or some other entity.

In one embodiment, for example, the VRS corrected LEO satellite position estimate of LEO satellite 100 is transmitted in this manner, via a communications channel, to for receipt by a terrestrial GNSS rover receiver which is configured for receiving messages sent from LEO satellite 100. Some non-limiting examples of a terrestrial GNSS rover receiver include a GNSS receiver on: an aircraft, a water borne vessel, a ground vehicle, and/or a surveying instrument. A terrestrial GNSS rover receiver can also include a terrestrially located fixed GNSS receiver, movable GNSS receiver, or a hand-holdable GNSS receiver. In another embodiment, the VRS corrected LEO satellite position estimate of the LEO satellite is transmitted in the described manner to a LEO control station, such as LEO control station 820 of FIG. 8A, which tracks and/or communicates with LEO satellite 100. Such a transmission to a LEO control station can be via a communications downlink channel or via a telemetry downlink channel. In yet another embodiment, the VRS corrected LEO satellite position estimate of LEO satellite 100 is transmitted to another satellite, via an outbound intersatellite crosslink channel. For example, the VRS corrected LEO satellite position estimate may be transmitted for receipt by a space borne GNSS rover receiver located on another satellite.

Example Master Reference Station

Figure 2:
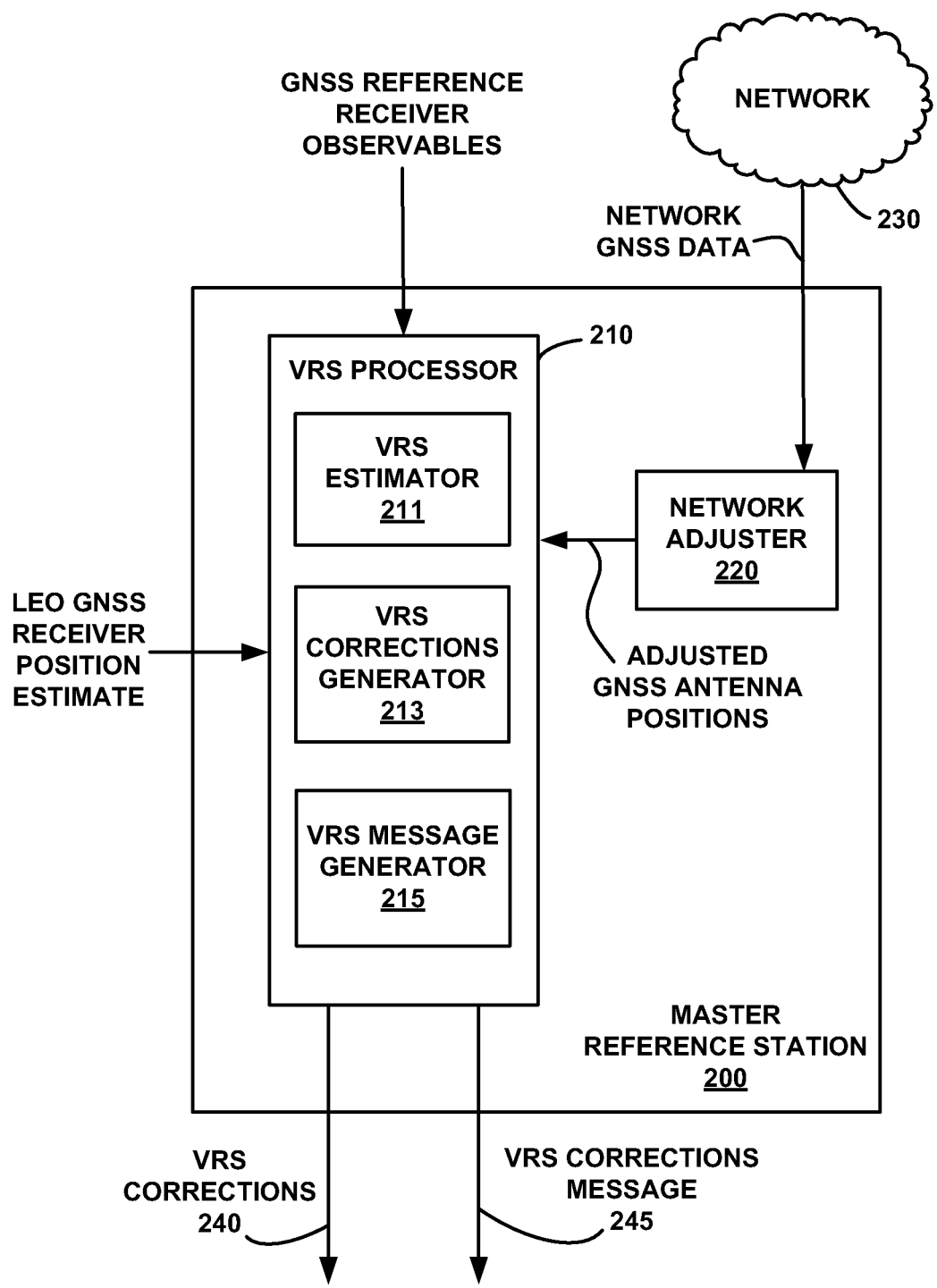
FIG. 2 is a block diagram of a master reference station, in accordance with an embodiment.

FIG. 2 illustrates an example master reference station 200 which produces VRS corrections for a particular position estimate, such as the first position estimate, from inputs which include GNSS observables measured by a network of a plurality of GNSS reference receivers. As shown in FIG. 2, in one embodiment, master reference station 200 includes a VRS processor 210 and a network adjuster 220. It is appreciated that in some embodiments, network adjuster is not included or is separate from master reference station 200.

Figure 10:
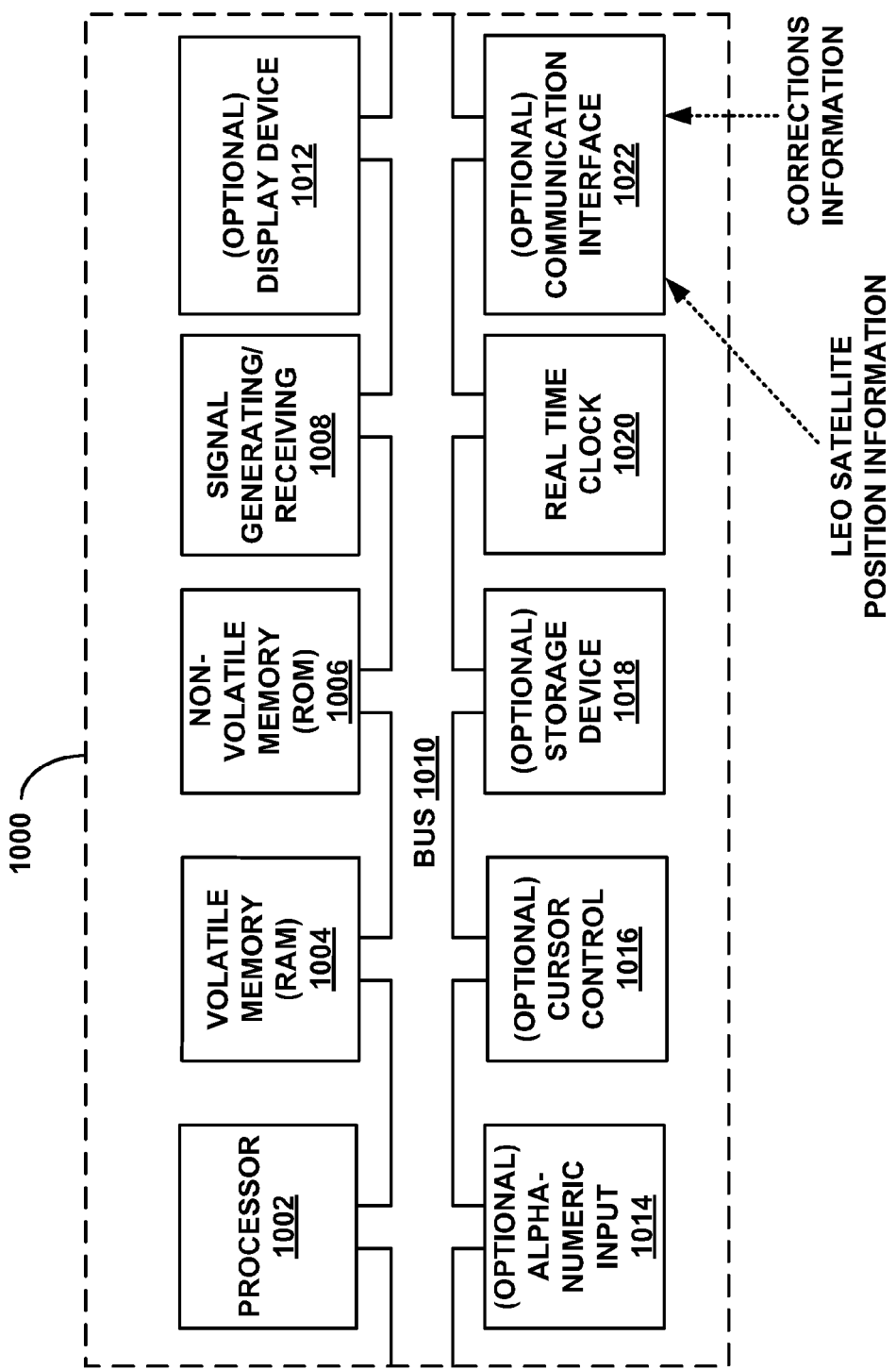
FIG. 10 shows an example computer system used in accordance with some embodiments.

Network adjuster 220 can be (or operate within), for example, a personal computer or server-class computer that runs network adjustment software. Computer system 1000 of FIG. 10 provides an example of a computer system which is configurable to perform the operations of network adjuster 220. The network adjustment software evaluates and possibly corrects the published antenna positions for selected GNSS reference receivers (e.g., GNSS reference receivers 840 of FIG. 8A), which may be permanent and/or dedicated reference receivers. The network adjustment software inputs network GNSS data which includes an array of files of GNSS reference receiver observables. Such network GNSS data may be downloaded from a publicly accessible source over a network 230 such as the Internet. Based on the network GNSS data, the network adjustment software computes the relative positions of the antennas of the reference receivers and stores these positions in a file or transmits the positions to VRS processor 210. To accomplish this, the network adjustment software can implement any one of a number of well-known, conventional algorithms currently used for network adjustment of static GNSS receivers. In addition to adjusted antenna positions, in some embodiments, network adjuster 220 provides VRS processor 210 with an assessment of data quality that a network adjustment typically generates.

In the technique introduced herein, VRS processor 210 receives and uses reference GNSS observables from multiple fixed-location GNSS reference receivers (e.g., all or some subset of GNSS reference receivers 840 of FIG. 8A), distributed around a mission area, such as beneath and adjacent to the orbital track of a LEO satellite. In one embodiment, the reference receivers that are used form the vertices of a polygon which, when projected upward, encompasses the location of the LEO GNSS position estimate received from a LEO satellite. In one embodiment, VRS processor 210 processes broadcast observables received from a plurality of GNSS receivers, including a plurality of GNSS reference receivers to generate VRS corrections for a position estimate, such as the first position estimate, determined by a GNSS receiver on-board a LEO satellite, such as LEO satellite 100. In some instances observables may be received from a GNSS receiver at previously established virtual reference station (including a LEO satellite based VRS) and/or from one or more other GNSS receivers in a mission area. VRS processor 210 can, for example, implement the VRS technique described by Eschenbach and O'Meagher (mentioned above). Note that VRS software which implements that technique can operate with any set of reference receiver observables, including permanent reference receiver observables.

VRS processor 210 is essentially a network KAR subsystem. VRS processor 210 receives as input the adjusted antenna positions as well as the reference GNSS data (e.g. observables) measured by a plurality of GNSS reference receivers and the position estimate (and in some instances observables information) that are provided by a GNSS receiver on-board a LEO satellite (e.g., GNSS receiver 105 on-board LEO satellite 100) during data acquisition. VRS processor 210 uses these inputs to compute and output a set of VRS corrections 240 and in some instances to generate a transmittable VRS corrections message that contains all or some portion of VRS corrections 240.

VRS processor 210 includes VRS software to compute a set of "synthetic" observables, i.e., observables for a virtual reference station (VRS). In certain embodiments, the position of the virtual reference station is taken as the geographic center of the project area. Note that the LEO GNSS receiver position estimate (such as the first position estimate), and in some instances other information collected by GNSS receiver 105, is used by VRS processor 210 to allow it to interpolate appropriate atmospheric delays and other errors to the approximate LEO satellite position estimate (e.g., the first position estimate) determined by GNSS receiver 105, and apply those delays in an appropriate manner to generate the synthetic VRS observables for the position estimate provided by LEO based GNSS receiver 105.

In one embodiment, VRS processor 210 computes a set of VRS corrections 240, which is a file of synthetic VRS observables and the VRS antenna position (i.e., the GNSS observables and antenna position of a virtual reference station). VRS processor 210, in one embodiment, includes a VRS estimator 211, a VRS corrections generator 213, and a VRS message generator 215. VRS estimator 211 implements a VRS estimation algorithm that estimates the parameters required to construct the correlated errors in the VRS observables. VRS corrections generator 213 inputs the estimated parameters, in the form of an output data set received from VRS estimator 211, and implements a VRS corrections data generation algorithm that computes the synthetic observables at the VRS position. In this embodiment, the VRS position is chosen to be at or near the LEO GNSS receiver position estimate (e.g., the first position estimate) that is provided as an input and the atmospheric error model. These synthetic observables form VRS corrections 240.

In some embodiments, VRS message generator 215 takes the synthetic observables (VRS corrections 240) as an input and formats some portion or all of them into a transmittable VRS corrections message or messages which can be transmitted, for example, to LEO satellite 100. Such formatting may include encoding and/or compressing the VRS corrections. In some embodiments, VRS message generator 215 or its functionality can be implemented separately from VRS processor 210 and/or master reference station 200. For example, in one embodiment, VRS message generator 215 is implemented as a function or component of a LEO control station which handles selected transmissions to and from a LEO satellite.

Example VRS Estimation Algorithm Inputs

The following is one example description of the inputs to the VRS estimation algorithm implemented by VRS estimator 211, according to an embodiment. It is appreciated that other or additional inputs may be used and that variations to the example algorithm and equations are possible within the spirit and scope of the example presented. The GNSS reference receiver network comprises N reference receivers whose antennas are located at positions given by the Cartesian coordinates $(x_k, y_k, z_k)$ with respect to a terrestrial reference frame, such as WGS84 for k=1, 2, ..., N. All subsequent Cartesian position coordinate specifications are given with respect to this coordinate frame, hereafter referred to as the "terrestrial reference frame". The transformation from these coordinates to any other system of coordinates is well-defined, and therefore does not limit the generality of the algorithm.

Each receiver tracks L1 and L2 signals from M GNSS satellites. For the $m^{th}$ tracked satellite in m=1, 2, ..., M, the $n^{th}$ reference receiver in n=1, 2, ..., N generates the following observables on frequencies i=1 (L1) and 2 (L2): pseudorange observables $\beta_{n,m}^i$ and carrier phase observables $\phi_{n,m}^i$.

All reference receivers generate the same broadcast ephemeris and satellite clock parameters for all satellites tracked by the receiver. These well-known parameters are specified in ICD-GPS-200 (referenced previously) and therefore not repeated here.

The precise ephemeris and clock parameters comprise periodic satellite positions in Cartesian coordinates with respect to the terrestrial reference frame and periodic satellite clock offset and drift parameters. These are available from various agencies that include NASA's Jet Propulsion Laboratory (JPL) and the International GNSS Service (IGS).

The VRS position is specified by terrestrial reference frame coordinates $(x_{VRS}, y_{VRS}, z_{VRS})$ even though, in the case of LEO satellite 100 for example, the coordinates may relate to an extra-terrestrial position.

The geometry of the space segment (positions of orbiting GNSS satellites as viewed from each reference receiver) varies continuously, and the number of GNSS satellites M visible at each reference receiver changes with time t. The physical separation of any pair of reference receivers in the network is typically on the order of 10-100 km, but may be more or less. The GNSS satellites are typically more widely dispersed, and therefore, their signals received at a given reference receiver probe largely different sections of the sky. A strong correlation between the ionospheric effects from receiver to receiver is therefore assumed, while the ionospheric effects from satellite to satellite are considered independent. Each GNSS satellite is (at this stage of processing) treated independently of the others for the entire period during which it is visible to the network. Differences between state estimates among different GNSS satellites are built later so that errors common to the GNSS satellites can be eliminated.

Example VRS Estimation Algorithm

According to one embodiment, the VRS estimation algorithm utilized by VRS estimator 211 is an implementation of the FAMCAR algorithm described in Ulrich Vollath, *The Factorized Multi-Carrier Ambiguity Resolution (FAMCAR) Approach for Efficient Carrier Phase Ambiguity Estimation*, Proceedings of ION GNSS 2004, Long Beach Calif., 21-24 Sep. 2004 (hereinafter "Vollath [2004]").

Figure 3:
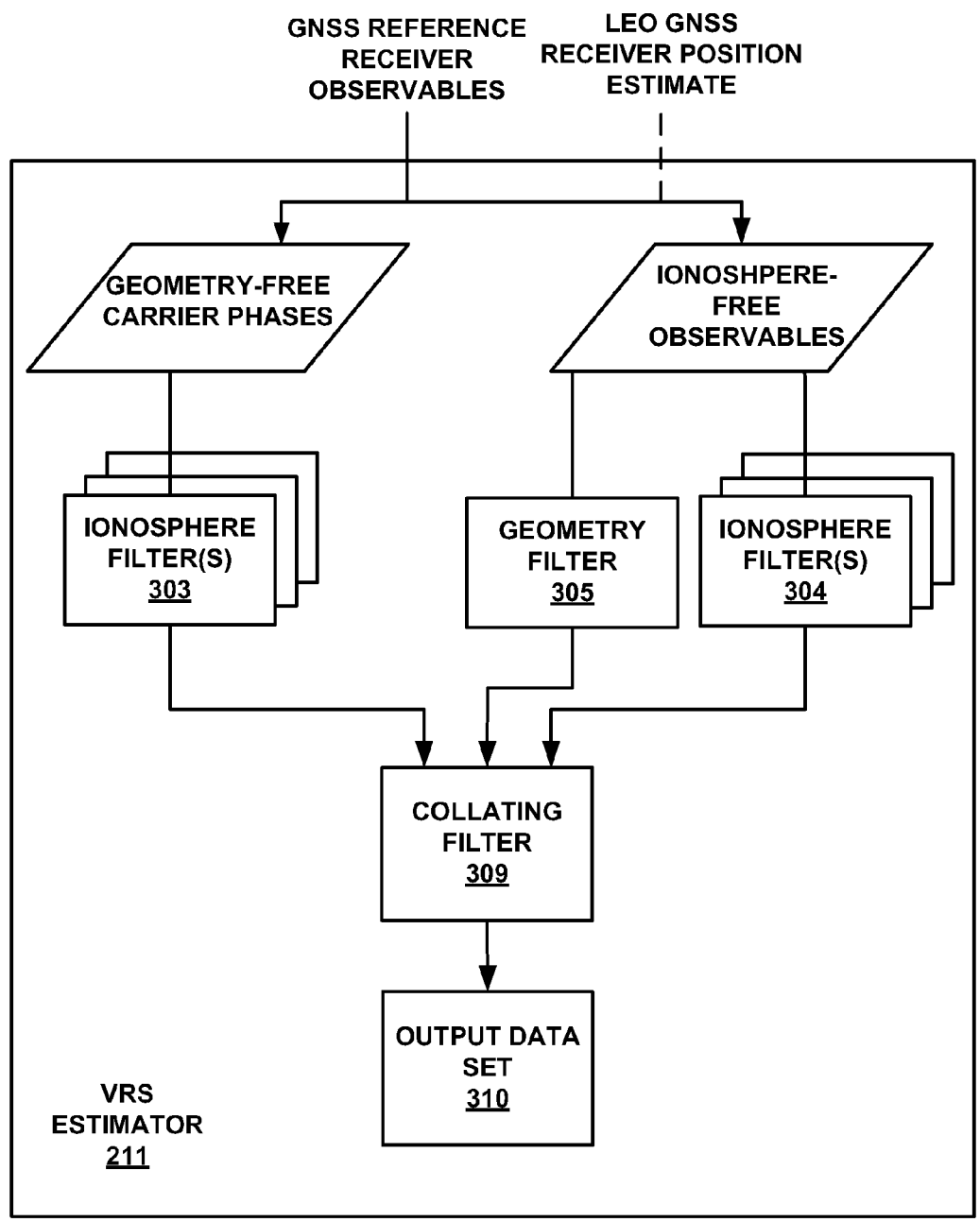
FIG. 3 illustrates shows a Virtual Reference Station (VRS) estimation data and processing flow diagram, in accordance with an embodiment.

The following is a description of one example of the VRS estimation algorithm used by VRS estimator 211, according to an embodiment. It is appreciated that in some embodiments variations to this example algorithm or the presented example equations are possible and that other and/or additional algorithms using different or additional inputs or other equations may be used. FIG. 3 illustrates the combined VRS estimation algorithm, comprising M ionosphere filters 303, one for each of the M satellites being tracked, M code filters 304, one for each of the M satellites being tracked, one geometry filter 305, and one collating filter 309. The input data (GNSS reference receiver observables and in some embodiments a LEO GNSS receiver position estimate and/or associated LEO GNSS receiver observables) to be processed at each measurement epoch comprises M sets of observables from each of N reference receivers. Each set of observables comprises L1 and L2 pseudoranges and L1 and L2 carrier phases.

The pseudorange or code observable from satellite m at carrier frequency i generated by receiver n is modeled as follows $$\rho_{n,m}^i = r_{n,m} + c(\delta T_n - \delta t_m) + T_{n,m} + I_{n,m}^i + \delta \rho_{n,m}^{mp} + \mu_{n,m}^i \quad (1)$$

where:
$r_{n,m}$ is the true range or distance between receiver antenna n and satellite m,
$\delta T_n$ is the receiver clock offset,
$\delta t_m$ is the satellite clock offset,
$T_{n,m}$ is the troposphere delay in meters,
$I_{n,m}^i$ is the ionosphere group delay in meters,
$\delta \rho_{n,m}^{mp}$ is the code multipath error resulting from reflections of signals in the surroundings of the receiver, and
$\mu_{n,m}^i$ is the code measurement noise generated by the receiver.

The carrier phase observable from satellite m at carrier frequency i generated by receiver n is modeled as follows $$\phi_{n,m}^i + N_{n,m}^i = -\frac{1}{\lambda_i}(r_{n,m} + c(\delta T_n - \delta t_m) + T_{n,m} - I_{n,m}^i + MP_{n,m}^i) + \eta_{n,m}^i \quad (2)$$

where:
$N_{n,m}^i$ is the initial (theoretical) number of full wavelengths of the carrier frequency between reference receiver n and satellite m for a signal traveling in vacuum,
$MP_{n,m}^i$ is the phase multipath error resulting from reflections of signals in the surroundings of the receiver and on the centimeter level,
$\eta_{n,m}^i$ is the phase measurement noise generated by the receiver, and
$\lambda_i$ is the carrier wavelength.

It is appreciated that ionosphere and/or troposphere delay may be experienced by many GNSS receivers, including reference receivers. However in many instances, depending on the location of a LEO satellite relative to the line of site to a GNSS satellite, ionosphere and/or troposphere delay to a signal from a GNSS satellite may or may not occur in the transmission path between the GNSS satellite and a GNSS receiver on-board a LEO satellite.

Equation (2) characterizes the carrier phase as the integrated Doppler frequency, so that carrier phase increases in the negative direction as the range increases. Currently Naystar GPS offers signals at two wavelengths $\lambda_1 = 0.19029$ m and $\lambda_2 = 0.24421$ m. There is a known physical relationship between the ionospheric group delay for different wavelengths, which relates the effect experienced for waves of different frequencies to a first order approximation as follows $$\frac{I_{n,m}^1}{I_{n,m}^2} = \frac{f_2^2}{f_1^2} = \frac{\lambda_1^2}{\lambda_2^2} \quad (3)$$

This approximation is fully sufficient for purposes of the technique introduced here.

The troposphere delay $T_{n,m}$, the clock offsets $\delta T_n$ and $\delta t_m$, and the true range between station and satellite $r_{n,m}$ are all independent of signal frequency. This fact can be exploited by taking the difference of the phase measurements for the station—satellite pairs to eliminate the frequency-independent parameters. From equation (2) the following geometry-free phase combination of L1 and L2 phases is obtained $$\phi_{n,m}^{gf} = \frac{\lambda_1^2}{\lambda_2^2 - \lambda_1^2} (\phi_{n,m}^1 \lambda_1 - \phi_{n,m}^2 \lambda_2) \qquad (4)$$
$$= -N_{n,m}^{gf} + MP_{n,m}^{gf} + I_{n,m} + \varepsilon_{n,m}^{gf}$$

where: $I_{n,m} = I_{n,m}^1$ (5)

$$N_{n,m}^{gf} = \frac{\lambda_1^2}{\lambda_2^2 - \lambda_1^2} (N_{n,m}^1 \lambda_1 - N_{n,m}^2 \lambda_2) \qquad (6)$$

$$MP_{n,m}^{gf} = \frac{\lambda_1^2}{\lambda_2^2 - \lambda_1^2} (MP_{n,m}^1 - MP_{n,m}^2) \qquad (7)$$

$$\varepsilon_{n,m}^{gf} = \frac{\lambda_1^2}{\lambda_2^2 - \lambda_1^2} (\eta_{n,m}^1 \lambda_1 - \eta_{n,m}^2 \lambda_2) \qquad (8)$$

Note that $N_{n,m}^{gf}$ is not an integer and has units of distance (meters). The purpose of constructing and then processing the measurements $\phi_{n,m}^{gf}$ is to determine the parameters $N_{n,m}^{gf}$, $MP_{n,m}^{gf}$ and $I_{n,m}$ within a consistent framework and consistent error estimates.

The linear ionosphere delay model of equation (3) allows the construction of L1 and L2 code and carrier phase combinations without ionosphere delay errors as follows. The ionosphere-free pseudorange is $$\rho_{n,m}^{if} = \gamma^{if} \left( \rho_{n,m}^1 - \frac{\lambda_1^2}{\lambda_2^2} \rho_{n,m}^2 \right) \qquad (9)$$
$$= (r_{n,m} + c(\delta T_n - \delta t_m) + T_{n,m}) + mp_{n,m}^{if} + \mu_{n,m}^{if}$$

where $\gamma^{if} = \dfrac{1}{1 - \dfrac{\lambda_1^2}{\lambda_2^2}}$ (10)

$$mp_{n,m}^{if} = \gamma^{if} \left( mp_{n,m}^1 - \frac{\lambda_1^2}{\lambda_2^2} mp_{n,m}^2 \right) \qquad (11)$$

$$\mu_{n,m}^{if} = \gamma^{if} \left( \mu_{n,m}^1 - \frac{\lambda_1^2}{\lambda_2^2} \mu_{n,m}^2 \right) \qquad (12)$$

The ionosphere-free carrier phase is $$\phi_{n,m}^{if} = \phi_{n,m}^1 - \frac{\lambda_1}{\lambda_2} \phi_{n,m}^2 \qquad (13)$$
$$= -\frac{1}{\lambda_{if}} \begin{pmatrix} r_{n,m} + c(\delta T_n - \delta t_n) - \\ T_{n,m} + MP_{n,m}^i \end{pmatrix} -$$
$$N_{n,m}^{if} + \varepsilon_{n,m}^{if}$$

where $N_{n,m}^{if} = N_{n,m}^1 - \dfrac{\lambda_1}{\lambda_2} N_{n,m}^2$ (14)

$$\varepsilon_{n,m}^{if} = \eta_{n,m}^1 - \frac{\lambda_1}{\lambda_2} \eta_{n,m}^2 \qquad (15)$$

$$\frac{1}{\lambda_{if}} = \lambda_1 \left( \frac{1}{\lambda_1^2} - \frac{1}{\lambda_2^2} \right) \Leftrightarrow \lambda_{if} = \frac{\lambda_1 \lambda_2^2}{\lambda_2^2 - \lambda_1^2} \qquad (16)$$

Note that $N_{n,m}^{if}$ is not an integer and has units of cycles. The purpose of constructing and then processing the measurements $\phi_{n,m}^{if}$ is to determine the parameters $N_{n,m}^{if}$, $MP_{n,m}^{if}$ and $T_{n,m}$ within a consistent framework and consistent error estimates.

The range-equivalent ionosphere-free carrier phase is given by $$O_{n,m}^{if} = -\lambda_{if} \phi_{n,m}^{if} \qquad (17)$$
$$= r_{n,m} + c(\delta T_n - \delta t_m) + T_{n,m} +$$
$$MP_{n,m}^i + \lambda_{if} N_{n,m}^{if} + \xi_{n,m}^{if}$$

where: $\xi_{n,m}^{if} = -\lambda_{if} \varepsilon_{n,m}^{if}$.

The ionosphere-free code minus carrier observables combination is constructed to cancel geometric terms as follows $$\rho_{n,m}^{if} - \theta_{n,m}^{if} = \qquad (18)$$
$$(mp_{n,m}^{if} + \mu_{n,m}^{if}) - (MP_{n,m}^i + \lambda_{if} N_{n,m}^{if} + \xi_{n,m}^{if}) \cong -\lambda_{if} N_{n,m}^{if} + \varepsilon_{n,m}^{if}$$

where: $\epsilon_{n,m}^{if} = \mu_{n,m}^{if} - \xi_{n,m}^{if}$ and $mp_{n,m}^{if} - MP_{n,m}^i \approx 0$, i.e. code and range-equivalent phase multipaths either cancel approximately or are small enough to be neglected.

The wide-lane carrier phase is given by $$\phi_{n,m}^{wl} = \phi_{n,m}^1 - \phi_{n,m}^2 \qquad (19)$$
$$= -\frac{1}{\lambda_{wl}} (r_{n,m} + c(\delta T_n - \delta t_m) + T_{n,m} - I_{n,m}^{wl} + MP_{n,m}^{wl}) +$$
$$N_{n,m}^{wl} + \varepsilon_{n,m}^{wl}$$

where $\lambda_{wl} = \dfrac{\lambda_2 - \lambda_1}{\lambda_1 \lambda_2}$ (20)

$$I_{n,m}^{wl} = \frac{\lambda_{wl}}{\lambda_1} I_{n,m}^1 - \frac{\lambda_{wl}}{\lambda_2} I_{n,m}^2 = -\frac{\lambda_2}{\lambda_1} I_{n,m}^1 \qquad (21)$$

$$N_{n,m}^{wl} = N_{n,m}^1 - N_{n,m}^2 \qquad (22)$$

$$MP_{n,m}^{wl} = \frac{\lambda_{wl}}{\lambda_1} MP_{n,m}^1 - \frac{\lambda_{wl}}{\lambda_2} MP_{n,m}^2 \qquad (23)$$

$$\varepsilon_{n,m}^{wl} = \varepsilon_{n,m}^1 - \varepsilon_{n,m}^2 \qquad (24)$$

The narrow-lane pseudorange is given by $$\rho_{n,m}^{nl} = \frac{\lambda_2 \rho_{n,m}^1 + \lambda_1 \rho_{n,m}^2}{\lambda_2 + \lambda_1} \qquad (25)$$
$$= r_{n,m} + c(\delta T_n - \delta t_m) + T_{n,m} + \frac{\lambda_2}{\lambda_1} I_{n,m}^1 +$$
$$\delta \rho_{n,m}^{mp} + \mu_{n,m}^{nl}$$

The wide-lane carrier phase minus narrow-lane pseudorange is constructed to cancel geometric terms and atmosphere delay errors.

$$\theta_{n,m}^{wl} - \rho_{n,m}^{nl} = -\lambda_{wl} N_{n,m}^{wl} + \epsilon_{n,m}^{wnl} \qquad (26)$$

where: $\theta_{n,m}^{wl} = -\lambda_{wl} \phi_{n,m}^{wl}$ and $\epsilon_{n,m}^{wnl} = \delta \rho_{n,m}^{mp} + MP_{n,m}^{wl} + \mu_{n,m}^{nl} - \lambda_{wl} \epsilon_{n,m}^{wl}$.

Ultraviolet radiation and a constant stream of particles from the sun ionize the gases of the earth's atmosphere to produce a layer of charged gases called the ionosphere. A charged gas is a dispersive medium for electromagnetic waves such as GNSS signals. To a very good approximation, the refractive index $\epsilon$ for an electromagnetic wave of frequency f (in units of 1/second) is given as $$\varepsilon \approx 1 - 40.3 \frac{n_e}{f^2} \tag{27}$$

where $n_e$ is the free electron density in the gas in units of $1/m^3$. The approximate constant 40.3 arises from a combination of natural constants such as electron mass, electron charge, etc. The result is a phase group delay and carrier phase advance of a modulated radio wave that penetrates the charged gas of $$\Delta\tau = -\frac{1}{c}\frac{40.3}{f^2}\int_r^s n_e dl \tag{28}$$

compared to the same signal traveling in a vacuum with refraction index $\epsilon_{vac}=1$, where the integral runs over the pathway that connects reference-station receiver r and satellite s. The integral expression is commonly referred to as the "Total Electron Content" (TEC). Expressed in units of meters (after multiplication by the speed of light), the relationship between ionospheric group delay/phase advance and total electron content is $$I = 40.3 \frac{TEC}{f^2} \tag{29}$$

The electron density of the ionosphere is known to have a pronounced maximum at an altitude of approximately 350 kilometers above ground. D. Bilitza, *International Reference Ionosphere* 2000, Radio Science 2 (36) 2001, 261 (hereinafter Bilitza [2001]) provides a detailed description. For this reason, the commonly called "lumped two-dimensional (2D) model" assigns the complete ionospheric effect to a thin shell surrounding the Earth at this altitude. This is described first herein as an introduction to the subsequent model used by the VRS algorithm.

Figure 4:
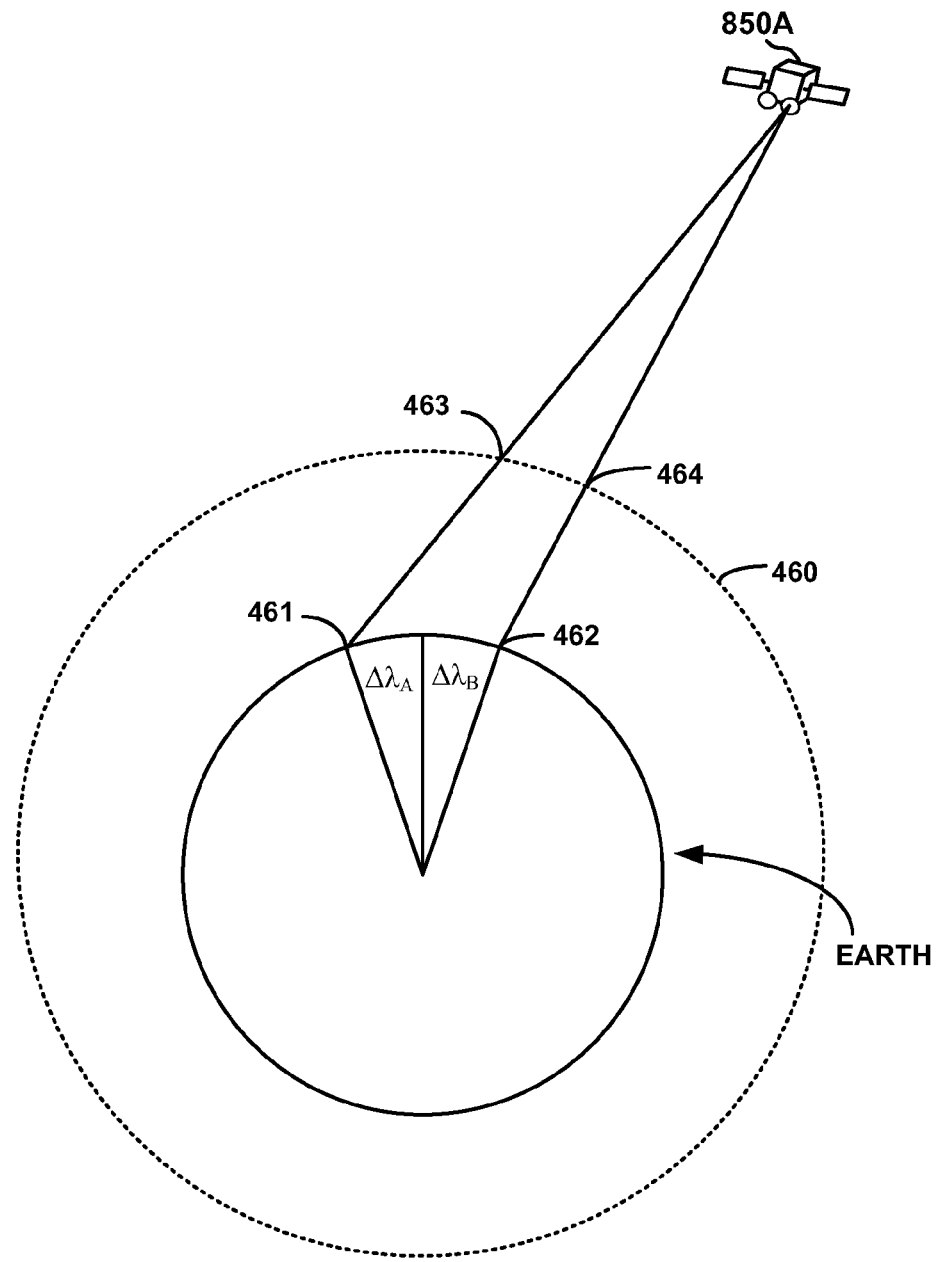
FIG. 4 shows an ionosphere delay shell model cross-section for one satellite and two GNSS receivers, in accordance with an embodiment.
Figure 5:
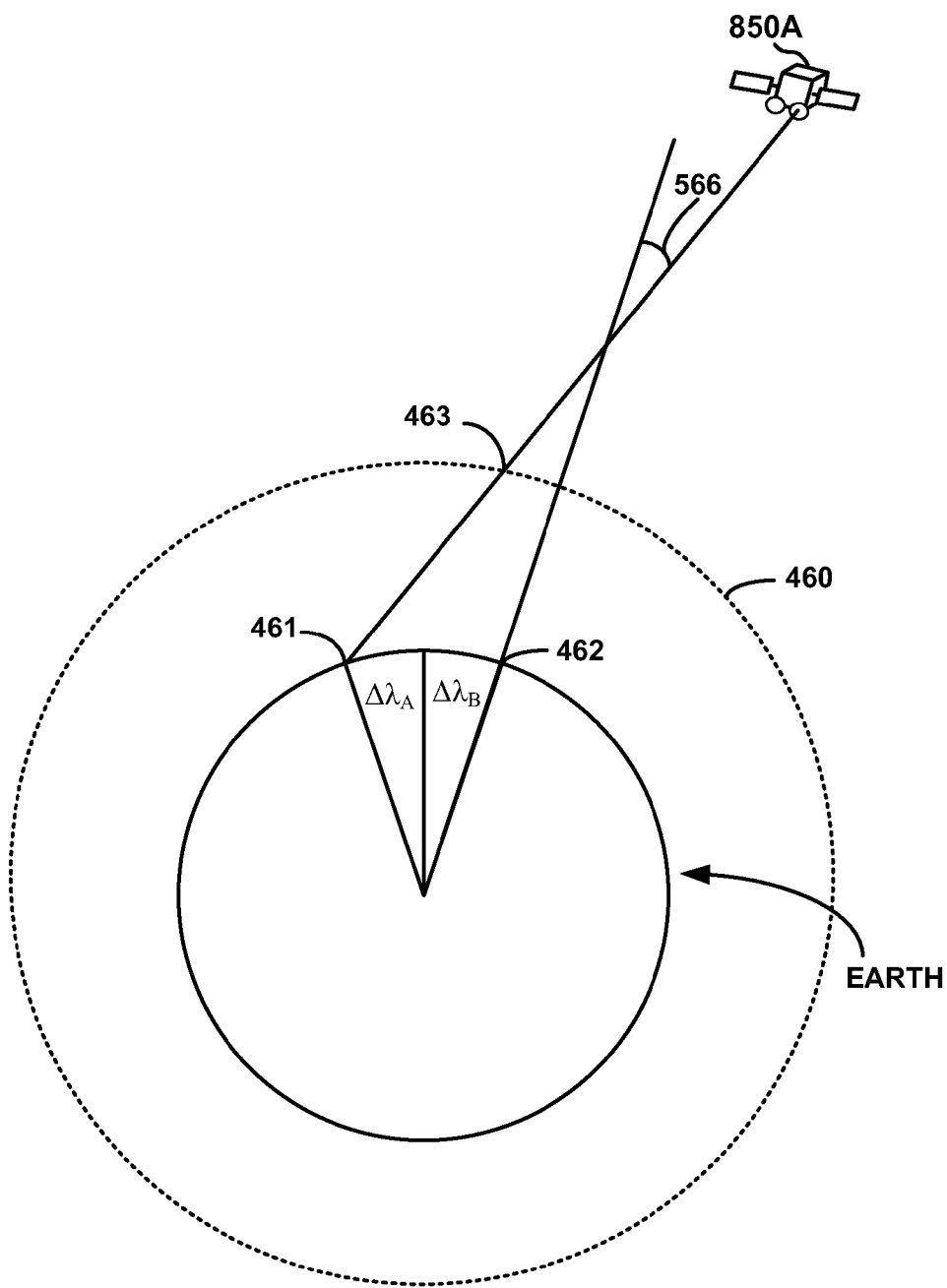
FIG. 5 shows an ionosphere delay shell model cross-section for one satellite and one GNSS receiver with the zenith angle used in an ionosphere delay model, in accordance with an embodiment.

FIG. 4 shows a simplified cross-sectional view of a lumped 2D ionosphere model with two signal paths from a single GNSS satellite 850A to receivers A (461) and B (462) that pierce the ionosphere shell 460 at pierce points A (463) and B (464). The latitude displacements of receivers A and B from a reference position between the receivers are $\Delta\lambda_A$ and $\Delta\lambda_B$. The slant ionosphere delay at pierce points A and B are $I_{A,1}$ and $I_{B,1}$. A similar drawing can be made for longitudinal displaced receivers. FIG. 5 shows a simplified cross-sectional view of a lumped 2D ionosphere model with one signal path from a single GNSS satellite 850A to a receiver 461. The angle of a path from GNSS satellite 850A to receiver 461 (line of sight) and a radial from the Earth center through the ionosphere pierce point 463 is the zenith angle 566. This arrangement is generalized to N receivers having relative latitude and longitude displacements $(\Delta\lambda_n, \Delta L_n)$, n=1, 2, ..., N, and M pierce points per receiver corresponding to the M satellites tracked by each receiver, each pierce point modeling the lumped ionospheric delay $I_{n,m}$ for m=1, 2, ..., M. A spatial model for these ionospheric delays derived from a first-order truncation of a spherical harmonic expansion is $$I_{n,m} = m_{n,m}^{iono}(I_{0,m}+a_m\Delta\lambda_n+b_m\Delta L_n) \tag{30}$$

where:
$I_{0,m}$ is the zenith ionospheric delay at a pierce point associated with the reference position for satellite m,
$a_m$ is the latitude scale on zenith ionospheric delays for satellite m,
$b_m$ is the latitude scale on zenith ionospheric delays for satellite m,
$m_{n,m}^{iono}$ is a mapping function that maps the zenith ionospheric delay at the
n,m pierce point to the ionospheric delay along the slanted signal path, given by $$m_{n,m}^{iono} = \frac{1}{\cos\varphi_{n,m}} \tag{31}$$

where $\phi_{n,m}$ is the zenith angle at the pierce point associated with receiver n and satellite m.

For each satellite m in view equation (30) contains parameters $(I_{0,m}, a_m, b_m)$ to characterize the ionosphere across the network area. These parameters together with the carrier-phase integer ambiguity and multipath states are to be estimated. The other terms $(m_{n,m}^{iono}, \Delta\lambda_n, \Delta L_n)$ in equation (30) are deterministic quantities given by the geometry of the network and the position of satellite m. Knowledge of these parameters allows equation (30) to the slant ionospheric delay $I_{r,m}$ to be predicted at any roving receiver position r in the network.

The linear model given by equation (30) can be improved by taking account of the ionosphere thickness as described in Bilitza [2001] (referenced previously).

Figure 6:
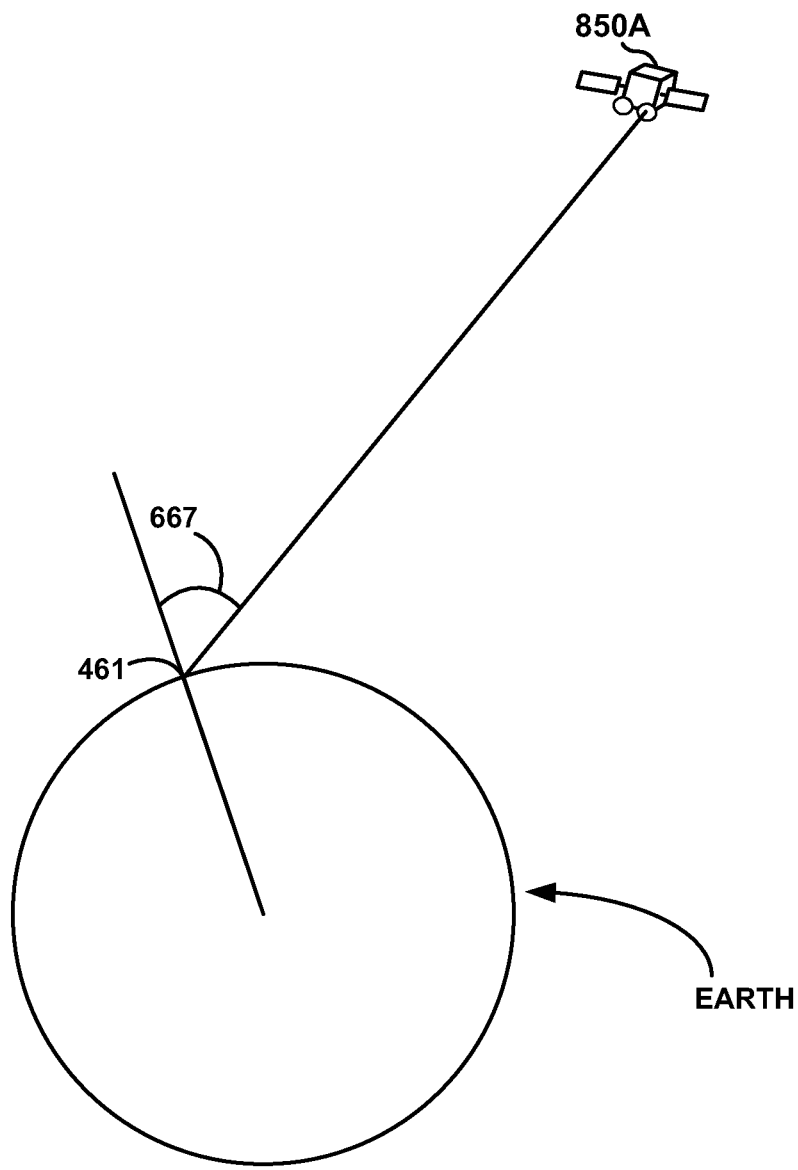
FIG. 6 shows a zenith angle at the receiver position that is used in a troposphere delay model, in accordance with an embodiment.

There are several different methods by which the troposphere delay along a slant signal path can be modeled for the purpose of estimating the delay in a least-squares estimation process. Hofmann-Wellenhof [2001] (referenced previously) provides a description of the theory behind various predictive models such as the Hopfield model. Most of these models comprise a model for the zenith troposphere delay at a given position multiplied by a mapping function that is a function of the zenith angle 667 of the GNSS satellite 850A at the receiver position 461 as shown in FIG. 6. The predicted slant troposphere delay along a signal path from satellite m to receiver n is $$\hat{T}_{n,m}=(1+m_{n,m}^{tropo})T_{n,0} \tag{32}$$

where
$T_{n,0}$ is the zenith troposphere delay at receiver n,
$m_{n,m}^{tropo}$ is the troposphere delay mapping function.
Hofmann-Wellenhof [2001] (referenced previously) provides examples of different mapping functions. This algorithm specification is not dependent on which troposphere model or mapping function is implemented.

The predicted slant troposphere delay is then assumed to differ from the actual delay at each reference receiver by a scale factor $S_n$ that lumps the different sources of prediction error for all satellite signal paths, as follows $$T_{n,m}=(1+S_n)\hat{T}_{n,m} \tag{33}$$

Given a set of troposphere scale factors $S_1, \ldots, S_N$ applicable at the N reference receiver positions, the following linear spatial interpolation model is used to construct the troposphere delay error at any position in the network.

$$S_r = (S_0 + c\Delta\lambda_r + d\Delta L_r) \quad (34)$$

The parameters $S_0$, c and d are determined from a least-squares adjustment of the over-determined set of linear equations using any statistical information on $S_1, \ldots, S_N$ that may be available to weight the adjustment.

$$\begin{bmatrix} S_1 \\ \vdots \\ S_N \end{bmatrix} = \begin{bmatrix} 1 & \Delta\lambda_1 & \Delta L_1 \\ \vdots & \vdots & \vdots \\ 1 & \Delta\lambda_N & \Delta L_N \end{bmatrix} \begin{bmatrix} S_0 \\ c \\ d \end{bmatrix} \quad (35)$$

The troposphere delay at any position r in the network is then computed as $$T_{r,m} = (1 + S_0 + c\Delta\lambda_r + d\Delta L)\hat{T}_{r,m} \quad (36)$$

A set of M ionosphere filters 303 in FIG. 3 estimate the parameters $(I_{0,m}, a_m, b_m)$ for each satellite m in 1, 2, ..., M that is visible to the network of N reference receivers. The ionosphere filtering algorithm comprises a standard Kalman filter, which is the optimal minimum variance estimator for a stochastic process given by the following general equations $$\vec{x}_k = \Phi_{k,k-1}\vec{x}_{k-1} + \vec{\mu}_k E[\vec{\mu}_k \vec{\mu}_k^T] = Q_k \quad (37)$$

$$\vec{z}_k = H_k \vec{x}_k + \vec{\eta}_k E[\vec{\eta}_k \vec{\eta}_k^T] = R_k \quad (38)$$

where $\vec{x}_k$ is the state vector, $\Phi_{k,k-1}$ is the state transition matrix, $Q_k$ is the process noise covariance, $\vec{z}_k$ is the measurement vector, $H_k$ is the measurement matrix, and $R_k$ is the measurement noise covariance. Equation (37) comprises the state dynamics equation, and Equation (38) comprises the measurement equation. The Kalman filter algorithm is described in numerous references, of which A. Gelb (editor), *Applied Optimal Estimation*, MIT Press, 1992 (hereinafter "Gelb [1992]") is an example.

The state vector containing the state variables to be estimated for each satellite m in 1, 2, ..., M is given by $$\vec{x}_m^{gf} = [N_{1,m}^{gf} \ldots N_{N,m}^{gf} MP_{1,m}^{gf} \ldots MP_{N,m}^{gf} I_{0,m} a_m b_m]^T \quad (39)$$

where $N_{1,m}^{gf}, \ldots, N_{N,m}^{gf}$ are the geometry-free combination of ambiguities given in (6), $MP_{1,m}^{gf}, \ldots, MP_{N,m}^{gf}$ are the multipath errors given in (7), $I_{0,m}$ is the ionospheric delay at the network reference position, $a_m, b_m$ are the ionosphere delay gradients in the latitude and longitude directions from the reference position.

The state transition matrix is given by $$\Phi_{k,k-1} = \begin{pmatrix} I_{N \times N} & & \\ & e^{-\Delta t/\tau_{MP}} I_{N \times N} & \\ & & \begin{matrix} 1 & \Delta\lambda_{CPP} & \Delta L_{CPP} \\ 0 & 1 & 0 \\ 0 & 0 & 1 \end{matrix} \end{pmatrix} \quad (40)$$

where $\Delta\lambda_{CPP}$ and $\Delta L_{CPP}$ are the latitude and longitude changes in the network reference position, $\tau_{MP}$ is the correlation time of a Gauss-Markov model for the multipath error, and $\Delta t = t_k - t_{k-1}$ is the Kalman filter iteration epoch corresponding to the GPS observables epoch.

The process noise covariance is given by $$Q_k = \begin{pmatrix} 0_{N \times N} & & \\ & \sigma_{MP}^2(1 - e^{-2\Delta t/\tau_{MP}})I_{N \times N} & \\ & & \begin{matrix} q_I & 0 & 0 \\ 0 & q_\lambda & 0 \\ 0 & 0 & q_L \end{matrix} \end{pmatrix} \quad (41)$$

where $\sigma_{MP}$ is the multipath error uncertainty standard deviation, and $q_I$, $q_\lambda$ and $q_L$ are process noise spectral densities for state vector elements $I_{0,m}$, $a_m$ and $b_m$. $\sigma_{MP}$ can be a constant or scaled by $1/\sin(\phi_{n,m})$ as part of model tuning to achieve good performance. $q_I$, $q_\lambda$ and $q_L$ relate to the velocity with which the pierce points travel across the ionosphere, and again are determined by model tuning for best performance.

The measurement vector contains the geometry-free phases (4) as follows $$\vec{z}_m = [\phi_{1,m}^{gf} \ldots \phi_{N,m}^{gf}]^T \quad (42)$$

The measurement model matrix is given by $$H_k = \begin{pmatrix} -I_{N \times N} & I_{N \times N} & \begin{matrix} m_{1,m} & m_{1,m}\Delta\lambda_1 & m_{1,m}\Delta L_1 \\ \vdots & \vdots & \vdots \\ m_{N,m} & m_{N,m}\Delta\lambda_N & m_{N,m}\Delta L_N \end{matrix} \end{pmatrix} \quad (43)$$

where $m_{n,m}$ are the mapping functions given by (31). $R_k$ is generally a diagonal matrix whose measurement noise variances are again determined as part of a tuning process.

A set of M code filters 304 in FIG. 3 is used to estimate the N×M wide-lane floated ambiguities defined by equation (22) from wide-lane carrier minus narrow-lane code measurements (26). Each code filter implements a Kalman filter algorithm with the following state dynamics model and measurements. The state vector for each code filter is $$\vec{N}_m^{wl} = [N_{1,m}^{wl} \ldots N_{N,m}^{wl}]^T \quad (44)$$

The state transition matrix is $$\Phi = I_{N \times N} \quad (45)$$

The process noise covariance is $$Q = q_N \Delta t \times I_{N \times N} \quad (46)$$

where $q_N$ is the spectral density of a random walk model for the floated ambiguities.

The code filter measurement for satellite m and receiver n is $$z_{n,m}^{cf} = \theta_{n,m}^{wl} - \rho_{n,m}^{nl} \quad (47)$$

The measurement model is given by $$z_{n,m}^{cf} = -\lambda_{wl} N_{n,m}^{wl} + \epsilon_{n,m}^{wnl} \quad (48)$$

The complete measurement vector is thus constructed as follows $$\vec{z}^{cf} = [z_{1,m}^{cf} \ldots z_{N,m}^{cf}]^T \quad (49)$$

and the measurement model matrix and measurement noise covariance matrix are constructed from (48) to be compatible with the measurement vector (49).

A geometry filter 305 in FIG. 3 is used to estimate the troposphere scale factors as well as other errors present in the ionosphere-free carrier phase observables. The geometry filter implements the Kalman filter algorithm with the following state dynamics model and measurements. The state vector is $$\bar{X}^{if} = [\bar{S} \; \delta\bar{T} \; \bar{N}^{if} \delta\bar{t} \; \delta\bar{r}_s]^T \quad (50)$$

where
- $\bar{S} = [S_1 \ldots S_N]^T$ is a vector of tropo-scaling states for each of N reference receivers,
- $\delta\bar{T} = [\delta T_1 \ldots \delta T_N]^T$ is a vector of N reference receiver clock offsets,
- $\bar{N}^{if} = [N_{1,1}^{if} \ldots N_{1,M}^{if} | \ldots | N_{N,1}^{if} \ldots N_{N,M}^{if}]^T$ is a vector of ionosphere-free ambiguities for N receivers and M satellites,
- $\delta\bar{t} = [\delta t_1 \ldots \delta t_M]^T$ is a vector of M satellite clock offsets,
- $\delta\bar{r}_{s\,s} = [\delta\bar{r}_{1\,1} \ldots \delta\bar{r}_{M\,M}]^T$ is a vector of M satellite orbital errors.

The state transition matrix is a block diagonal matrix given by $$\Phi = \text{diag}[I_{N\times N} | I_{N\times N} | I_{MN\times MN} | I_{M\times M} | e^{-\Delta t/\tau_{oe}} I_{3M\times 3M}] \quad (51)$$

where $\tau_{oe}$ is the correlation time of a Gauss-Markov model for the orbital error components. The process noise covariance matrix is a block diagonal matrix given by $$Q = \text{diag}[q_{ts}\Delta t \times I_{N\times N} | 0_{N\times N} | 0_{MN\times MN} | 0_{M\times M} | \sigma_{oe}^2 (1-e^{-2\Delta t/\tau_{oe}}) I_{3M\times 3M}] \quad (52)$$

where $q_{ts}$ is the spectral density of a random walk model for the troposphere scale factor parameters, and $\sigma_{oe}$ is the initial uncertainty standard deviation of the orbital error components.

The geometry filter constructs measurements from the range-equivalent ionosphere-free carrier phases given by (17) and the ionosphere-free code minus carrier observables combinations given by (18). The ionosphere-free carrier phase measurement from satellite m and receiver n at a given measurement epoch is given as follows $$z_{n,m}^{ifcp} = \theta_{n,m}^{if} - \hat{T}_{n,m} - \hat{r}_{n,m} \quad (53)$$

where $\hat{r}_{n,m}$ is the computed range from the computed position of satellite m at the measurement epoch and the known receiver n antenna position, and $\hat{T}_{n,m}$ is a predicted troposphere signal delay from satellite m and receiver n. The measurement model is $$\tilde{z}_{n,m}^{ifcp} = \begin{bmatrix} \hat{T}_{n,m} & 1 & \lambda_{if} & -1 & \dfrac{\partial \theta_{n,m}^{if}}{\partial \delta\bar{r}_m} \end{bmatrix} \begin{bmatrix} S_n \\ \delta T_n \\ N_{n,m}^{if} \\ \delta t_m \\ \delta\bar{r}_m \end{bmatrix} + \xi_{n,m}^{if} \quad (54)$$

where $$\dfrac{\partial \theta_{n,m}^{if}}{\partial \delta\bar{r}_m}$$

is the Jacobian of the range-equivalent phase with respect to the orbital error sub-state for satellite m. The code minus carrier measurement from satellite m and receiver n is given by $$z_{n,m}^{ifcmc} = \rho_{n,m}^{if} - \theta_{n,m}^{if} \quad (55)$$

The measurement model is given by $$z_{n,m}^{ifcmc} = \lambda_{if} N_{n,m}^{if} \epsilon_{n,m}^{if} \quad (56)$$

The complete measurement vector is thus constructed as follows $$\bar{Z}^{if} = [z_{1,1}^{ifcp} z_{1,1}^{ifcmc} \ldots z_{1,M}^{ifcp} z_{1,M}^{ifcmc} \ldots z_{N,M}^{ifcp} z_{N,M}^{ifcmc}]^T \quad (57)$$

and the measurement model matrix and measurement noise covariance matrix are constructed from (54) and (56) to be compatible with the measurement vector (57).

Referring again to FIG. 3, collating filter 309 combines the estimated state vectors from the M ionosphere filters, the M code filters and the geometry filter to generate an output data set 310 containing separate estimates of the ionosphere model (30) parameters for each satellite, troposphere scale factors (33) for each receiver, and carrier phase ambiguities and multipath errors for each of N×M×2 L1 and L2 carrier phases. The L1 and L2 carrier phase ambiguities are recovered as follows. Given floated estimates $\hat{N}_{n,m}^{gf}$, $\hat{N}_{n,m}^{cf}$ and $\hat{N}_{n,m}^{if}$, the estimated L1 and L2 ambiguities can be obtained by applying the following least-squares solution derived from equations (6) and (14)

$$\begin{bmatrix} \hat{N}_{n,m}^1 \\ \hat{N}_{n,m}^2 \end{bmatrix} = (A^T P A)^{-1} A^T P \begin{bmatrix} \hat{N}_{n,m}^{gf} \\ \hat{N}_{n,m}^{wl} \\ \hat{N}_{n,m}^{if} \end{bmatrix} \quad (58)$$

where $$A = \begin{bmatrix} \dfrac{\lambda_1^3}{\lambda_2^2 - \lambda_1^2} & -\dfrac{\lambda_1^2 \lambda_2}{\lambda_2^2 - \lambda_1^2} \\ 1 & -1 \\ 1 & -\dfrac{\lambda_1}{\lambda_2} \end{bmatrix} \quad (59)$$

Example VRS Corrections Data Algorithm

VRS corrections generator 213 employs a VRS corrections data algorithm to generate observables for a LEO GNSS receiver position estimate, such as a position estimate (e.g. the first position estimate) determined by GNSS receiver 105 on LEO satellite 100. The VRS corrections data algorithm employed by VRS corrections generator 213 can be an implementation of one of several different ambiguity resolution algorithms that have been described in public domain publications. For example, in one embodiment, the VRS corrections data algorithm employed by VRS corrections generator 213 is an implementation of the LAMBDA algorithm described in P. Teunisson, *The Least-Squares Ambiguity Decorrelation Adjustment*, Journal of Geodesy 70, 1-2, 1995, and generates integer least-squares estimates of the ambiguities.

Figure 7:
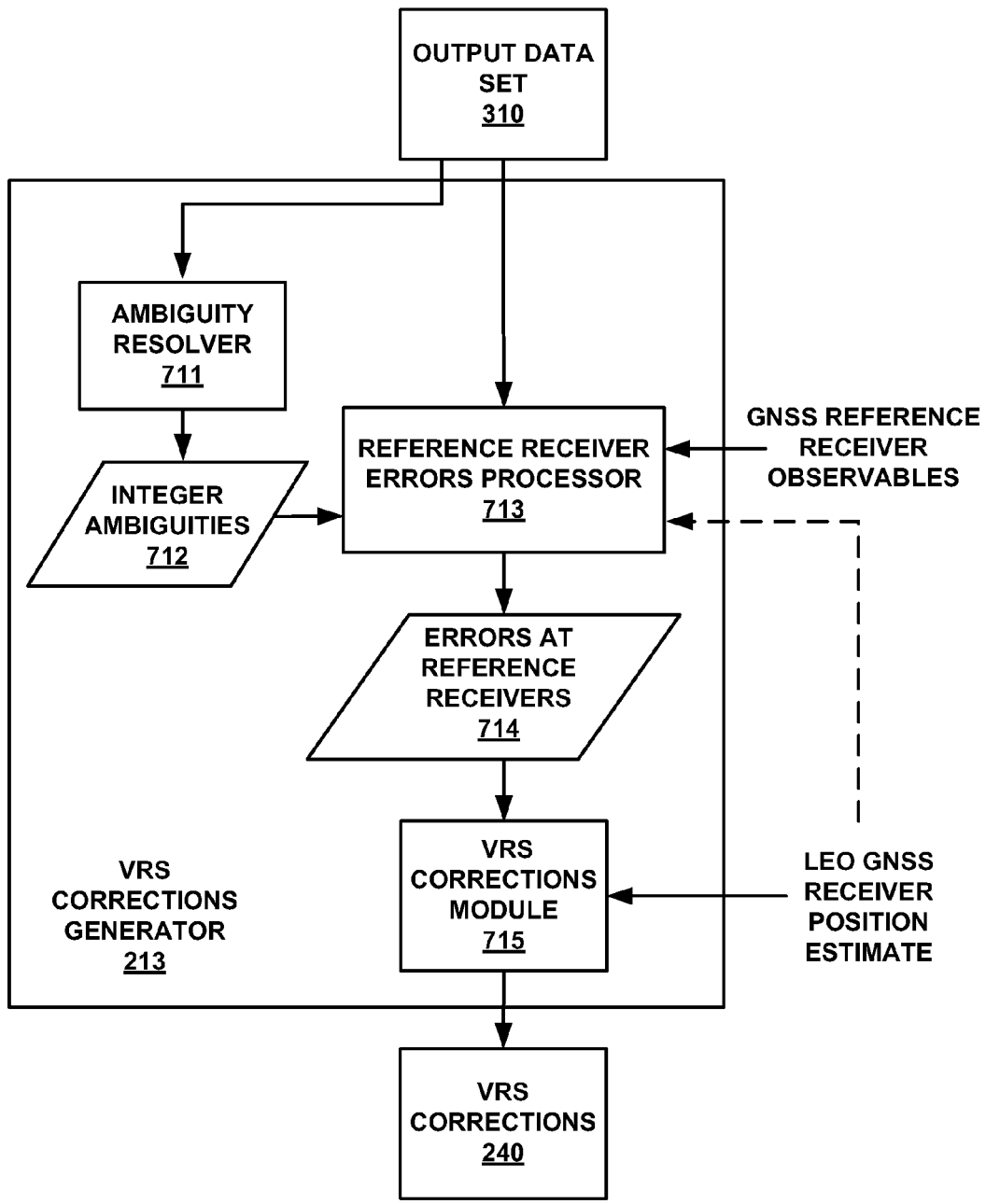
FIG. 7 shows a VRS observables generation data and processing flow diagram, in accordance with an embodiment.

With reference to FIG. 7, an example VRS corrections data algorithm, used by VRS corrections generator 213 in one embodiment, will now be described. It is appreciated that, in some embodiments, variations to this example algorithm or the presented example equations are possible and that other and/or additional algorithms using different or additional inputs or other equations may be used. The algorithm operates on the observables data of the output data set 310 of VRS estimator 211. The floated ambiguities plus estimation statistics generated by the Kalman filter are directed to the ambiguity resolution module 711. The fixed integer ambiguities 712 along with the observables from the N reference receivers and the previously generated parameters of output data set 310 are provided to reference receiver errors processor 713, which combines these inputs to compute the ionosphere and troposphere signal delay errors 714 at each of the N reference receivers to the M satellites being used in the network solution. In some embodiments, reference receiver errors processor 713 also receives a LEO GNSS receiver position estimate (e.g., the first position estimate) and/or associated LEO GNSS receiver observables as inputs.

VRS corrections module 715 generates the observables at the VRS position in two stages. VRS corrections module 715 first estimates the correlated atmospheric and environment errors at the rover position, which in this case is the LEO GNSS receiver position estimate (e.g. the first position estimate). VRS corrections module 715 then generates pseudorange and carrier phase observables that are geometrically referenced at the VRS position and exhibit correlated atmospheric and environment errors occurring at the rover position (in this case, the approximate position of the a LEO satellite as represented by the LEO GNSS receiver position estimate). Either of the following two methods, or other methods, of estimation and VRS observables generation can be used.

In one embodiment, VRS corrections module 715 in FIG. 7 computes the correlated atmospheric and environment errors at the rover position using a precise VRS estimation process. This process runs the respective ionosphere filters and the geometry filter with reduced state vectors that exclude the floated ambiguity states, since these are now assumed to be known with no uncertainty. These are called the precise ionosphere filters and the precise geometry filter because they use precise carrier phase data to formulate their respective estimations.

The precise ionosphere filter state vector becomes $$\bar{x}_m^{gf} = [MP_{1,m}^{gf} \ldots MP_{N,m}^{gf} I_{0,m} a_m b_m]^T \quad (60)$$

The precise ionosphere filters process the following geometry-free phase measurements
$$\varphi_{n,m}^{gf} + \overline{N}_{n,m}^{gf} = MP_{n,m}^{gf} + I_{n,m}^{gf} + \epsilon_{n,m}^{gf} \quad (61)$$

$$\overline{N}_{n,m}^{gf} = \frac{\lambda_1^2}{\lambda_2^2 - \lambda_1^2}\left(\overline{N}_{n,m}^1 \lambda_1 - \overline{N}_{n,m}^2 \lambda_2\right) \quad (62)$$

where $\overline{N}_{n,m}^1$ and $\overline{N}_{n,m}^2$ are the fixed L1 and L2 integer ambiguities 712. The transition matrix (40) process noise covariance (41) and measurement model matrix (43) are truncated to reflect the reduced state dynamics model. The resulting estimated state elements ($I_{0,m}$, $a_m$, $b_m$) for m in 1, ..., M provide parameters for the ionosphere model (30) at a level of accuracy consistent with a fixed integer ambiguity position solution. The precise geometry filter state vector becomes $$\bar{x}^{if} = [\bar{S} \, \delta\bar{T} \, \delta\bar{t} \, \delta\bar{r}_s]^T \quad (63)$$

The precise geometry filter processes the following ionosphere-free measurements $$\bar{z}_{n,m}^{ifcp} = \theta_{n,m}^{if} - \hat{T}_{n,m} - \hat{r}_{n,m} - \lambda_{if}\overline{N}_{n,m}^{if} \quad (64)$$

$$= \begin{bmatrix} \hat{T}_{n,m} & 1 & -1 & \frac{\partial \theta_{n,m}^{if}}{\partial \delta \bar{r}_m} \end{bmatrix} \begin{bmatrix} S_n \\ \delta T_n \\ \delta t_m \\ \delta \bar{r}_m \end{bmatrix} + \xi_{n,m}^{if}$$

$$\bar{z}_{n,m}^{ifcmc} = \rho_{n,m}^{if} - \theta_{n,m}^{if} + \lambda_{if}\overline{N}_{n,m}^{if} \cong \varepsilon_{n,m}^{if} \quad (65)$$

$$\overline{N}_{n,m}^{if} = \overline{N}_{n,m}^1 - \frac{\lambda_1}{\lambda_2}\overline{N}_{n,m}^2 \quad (66)$$

The transition matrix, (51), process noise covariance (52) and measurement model matrices derived from (64) and (65) are truncated to reflected the reduced state dynamics model. The resulting estimated state elements $\bar{s} = [S_1 \ldots S_N]^T$ provide troposphere scale factors at the N reference receiver positions at a level of accuracy consistent with a fixed integer ambiguity position solution. These are used to construct the troposphere delay error at any position in the network using a linear spatial interpolation model (36).

The VRS observables (VRS corrections 240) are then computed as follows. A master reference receiver R is identified from among the N reference receivers, typically the reference receiver that is closest to the VRS position (the LEO GNSS receiver position estimate). The observables comprise pseudoranges modeled by (1) and dual-frequency carrier phases modeled by (2) with n=R. The VRS observables used comprise the master reference receiver observables with applicable troposphere and ionosphere delay errors at the rover receiver position, which in this instance is the LEO GNSS receiver position. The VRS pseudoranges are computed as follows $$\rho_{V,m}^i = \rho_{R,m}^i + \Delta r_{VR,m} + (\hat{T}_{r,m} - \hat{T}_{R,m}) + (\hat{I}_{r,m}^i - \hat{I}_{R,m}^i) \quad (67)$$

where:

$\Delta\rho_{VR,m}$ is a geometric range displacement from the master reference receiver to the VRS position given by $\Delta r_{VR,m} = |\vec{r}_{s\,m} - \vec{r}_V| - |\vec{r}_{s\,m} - \vec{r}_{R\,R}|$, $\hat{T}_{r,m} - \hat{T}_{R,m}$ is the difference in troposphere delays computed from the interpolation model (36) using the model parameters derived in (35) from the estimated troposphere scale factors in the precise geometry state (63), $\hat{I}_{r,m}^i - \hat{I}_{R,m}^i$ is the difference in ionosphere delays computed from the interpolation model (30) using the model parameters in the precise ionosphere filter states (60).

The VRS carrier phases are constructed as follows $$\varphi_{V,m}^i = \varphi_{R,m}^i - 1/\lambda_i(\Delta r_{VR,m} + (\hat{T}_{r,m} - \hat{T}_{R,m}) + (\hat{I}_{r,m}^i - \hat{I}_{R,m}^i)) \quad (68)$$

These VRS observables have the same receiver clock offset, satellite clock errors, multipath errors and observables noises as the master reference receiver. They have the approximately same troposphere and ionosphere delay errors as the roving receiver, which in this case is a LEO satellite, such as LEO satellite 100. Consequently, single differences between rover receiver (e.g., GNSS receiver 105) and VRS observables will result in the approximate cancellation of applicable troposphere and ionosphere delay errors as well as exact cancellation of satellite clock errors.

In another embodiment, VRS corrections module 715 in FIG. 7 computes the correlated atmospheric and environment errors in the carrier phases at the rover position using interpolation of the carrier phase residuals. This method is predicated on the assumption that correlated atmospheric delay errors in the double-differenced carrier phase residuals conform to an approximate linear spatial model similar to (30). Each carrier phase residual is computed as $$\delta\phi_{n,m}^i = \phi_{n,m}^i + \overline{N}_{n,m}^i + \frac{1}{\lambda_i}\hat{r}_{n,m} \quad (69)$$

$$= -\frac{1}{\lambda_i}(\delta\hat{r}_{n,m} + c(\delta T_n - \delta t_m) +$$

$$T_{n,m} - I_{n,m}^i + MP_{n,m}^i) + \eta_{n,m}^i$$

where $\hat{r}_{n,m}$ is the estimated range between receiver n and satellite m using best available ephemeris data, $\overline{N}_{n,m}^i$ is the fixed integer ambiguity for i=1, 2, n=1, ..., N and m=1, ..., M. The double-differenced carrier phase residuals are computed as $$\nabla \Delta \delta \phi_{n,m}^i = (\delta \phi_{n,m}^i - \delta \phi_{n,mb}^i) - (\delta \phi_{nb,m}^i - \delta \phi_{nb,mb}^i) \quad (70)$$

$$= -\frac{1}{\lambda_i}(\nabla \Delta T_{n,m} - \nabla \Delta I_{n,m}^i + \nabla \Delta M P_{n,m}^i) +$$

$$\nabla \Delta \eta_{n,m}^i$$

where nb in 1, ..., N is a base receiver for computing between receiver single differences and mb in 1, ..., M is a base satellite for computing between satellite single differences. Double differencing effects the cancellation of common mode errors between satellites and between receivers, notably the receiver clock offsets, satellite clock offsets and orbital errors.

A spatial interpolation model similar to (30) for the double-differenced residuals for satellite m in 1, ..., M is given by $$\nabla \Delta \delta \phi_{n,m}^i = \delta \nabla \Delta \phi_{0,m}^i + a_m^i \Delta \lambda_n + b_m^i \Delta L_n \quad (71)$$

where:
$\delta \nabla \Delta \phi_{0,m}^i$ is the double-differenced residual associated with the reference position for satellite m,
$a_m^i$ is the latitude scale on the double-differenced residual for satellite m,
$b_m^i$ is the latitude scale on the double-differenced residual for satellite m.

The parameters $\delta \nabla \Delta \hat{\phi}_{0,m}$, $\hat{a}_m^i$ and $\hat{b}_m^i$ are computed as estimates from a least-squares adjustment using the model (71) with measurements (70). The estimated residuals at the rover position are then given by $$\nabla \Delta \delta \hat{\phi}_{r,m}^i = \delta \nabla \Delta \hat{\phi}_{0,m}^i + \hat{a}_m^i \Delta \lambda_r + \hat{b}_m^i \Delta L_r \quad (72)$$

where $(\Delta \lambda_r, \Delta L_r)$ are the rover antenna relative position coordinates with respect to the reference position. The undifferenced residuals containing the correlated phase errors are then obtained by reversing the double difference operation (70) as follows.

$$\delta \hat{\phi}_{r,m}^i = \nabla \Delta \delta \hat{\phi}_{r,m}^i + (\delta \phi_{nb,m}^i - \delta \phi_{nb,mb}^i) + \delta \hat{\phi}_{r,mb}^i \quad (73)$$

where $\delta \phi_{nb,m}^i$ and $\delta \phi_{nb,mb}^i$ are given by (69). $\delta \hat{\phi}_{r,mb}^i$ is constructed as follows $$\delta \hat{\phi}_{r,mb}^i = -\frac{1}{\lambda_i}(\hat{T}_{r,mb} - \hat{I}_{r,mb}^i)$$

where $\hat{I}_{r,mb}^i$ and $\hat{T}_{r,mb}$ are computed by interpolation using (30) and (36).

The VRS observables (VRS corrections 240) are then computed as follows. A master reference receiver R is identified from among the N reference receivers, typically the reference receiver that is closest to the VRS position (the LEO GNSS receiver position estimate). The VRS pseudoranges are computed using (67) with $\hat{T}_{r,m} - \hat{T}_{R,m}$ computed from the interpolation model (36) using the model parameters derived in (35) from the estimated troposphere scale factors in the estimated geometry filter state (50), and $\hat{I}_{r,m}^i - \hat{I}_{R,m}^i$ from the interpolation model (30) using the model parameters in the ionosphere filter states (39). The VRS carrier phases are constructed as follows $$\phi_{V,m}^i = \phi_{R,m}^i - (1/\lambda_i) \Delta r_{VR,m} - \delta \phi_{R,m}^i + \delta \hat{\phi}_{r,m}^i \quad (74)$$

where $\delta \phi_{R,m}^i$ was computed in (69) and $\delta \hat{\phi}_{r,m}^i$ is the interpolated carrier phase residual given by (73). The VRS corrections 24 comprise observables (or corrections to observables) which have the same receiver clock offset, satellite clock errors, multipath errors and observables noises as the master reference receiver. They have the approximately same troposphere and ionosphere delay errors as the roving receiver. Consequently, single differences between rover receiver (e.g., GNSS receiver 105) and VRS observables will result in the approximate cancellation of troposphere and ionosphere delay errors as well as exact cancellation of satellite clock errors.

Example Positioning and Navigation System

Figure 8A:
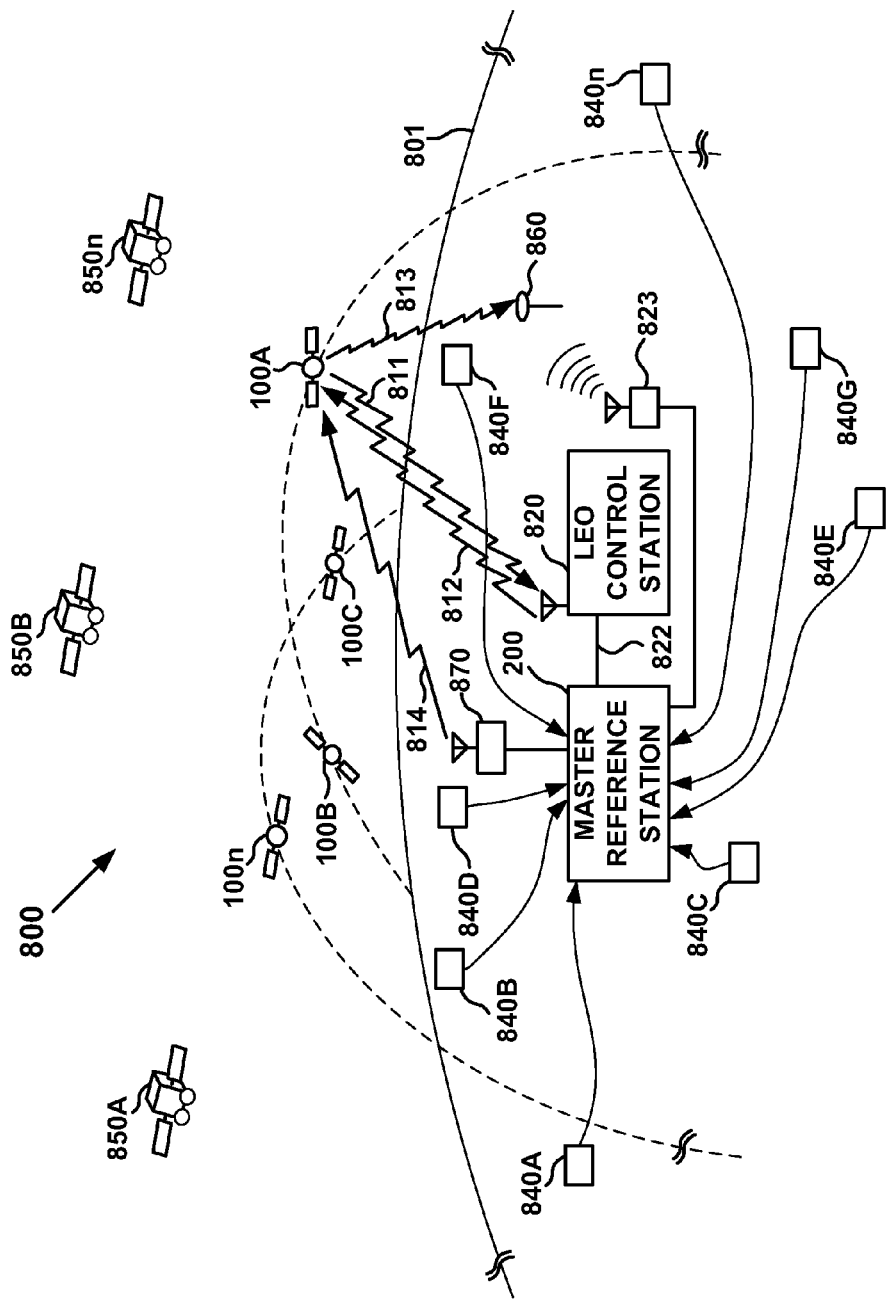
FIG. 8A shows a positioning and navigation system in accordance with an embodiment.

FIG. 8A shows a positioning and navigation system 800 in accordance with an embodiment. According to one embodiment, positioning and navigation system 800 includes at least one LEO satellite 100 (e.g., 100A, 100B, 100C, 100n) in low earth orbit around the Earth 801, a LEO control station 820, a master reference station 200, and a network of a plurality of GNSS reference receivers 840 (e.g., 840A, 840B, 840C, 840D, 840E, 840F, 840G, ..., 840n) coupled with master reference station 200. It is appreciated that master reference station 200 can be collocated with or geographically separated from LEO control station 820, and that in some embodiments, master reference station 200 communicates directly with a LEO satellite 100. In the embodiment shown in FIG. 8A, LEO control station 820 and master reference station 200 are communicatively coupled via communicative coupling 822. Communicative coupling can comprise a wired, optical, wireless, and/or network coupling or some combination thereof. In one embodiment, master reference station 200 is also communicatively coupled with a terrestrial communications network 823, such a radio network, cellular telephone network, or other wired, optical, or wireless communications network or combination thereof. In one such embodiment, master reference station communicates VRS corrections information to terrestrial GNSS rover receivers via terrestrial communications network 823.

A LEO satellite 100, such as LEO satellite 100A, operates in the fashion previously described. For example, LEO satellite 100 is equipped with a GNSS receiver 105 for receiving GNSS signals broadcast from a plurality of GNSS satellites 850 (e.g., 850A, 850B, ..., 850n). From these signals, GNSS receiver measures broadcast observables and uses these broadcast observables to generate a position estimate (e.g. the first position estimate) indicative of an approximate position of the LEO satellite. The GNSS position estimate is formatted into a GNSS information message, for example by GNSS information formatter 110, and transmitted from LEO satellite 100A to LEO control station 820. LEO control station 820 decodes the message and forwards the GNSS information (e.g., the GNSS LEO receiver position estimate) to master reference station 200.

At master reference station 200, the LEO GNSS receiver position estimate, indicative of the approximate position of LEO satellite 100A, is supplied as an input to VRS processor 210. VRS processor 210 uses the LEO GNSS position estimate in the generation of VRS corrections for the LEO GNSS position estimate. In the manner described above, master reference station 200 also receives GNSS reference receiver observables as inputs. These reference receiver observables are measured and collected by a plurality of GNSS receivers, such as GNSS reference receivers 840 and other in some instances other GNSS receivers in a mission area.

VRS corrections generated by VRS processor 210 are then formatted into a VRS corrections message, such as by VRS message generator 215. The VRS corrections message is transmitted back to LEO satellite 100A, where it is received, demodulated, and decoded. The VRS corrections decoded from the message are provided to corrections processor 150, which then processes the VRS corrections on-board LEO satellite 100A, such that a VRS corrected LEO satellite position estimate is produced. In the manner described above, in one embodiment, the VRS corrected LEO satellite position estimate is used as an input to an orbit control subsystem of LEO satellite 100A.

In one embodiment, the VRS corrected LEO satellite position estimate is formatted in to a VRS corrected LEO satellite position message, for example by VRS corrected position formatter 170. The VRS corrected LEO satellite position message is then modulated and transmitted from LEO satellite 100A. In this manner, the VRS corrected LEO satellite position estimate can be transmitted to another satellite, to a control station, a GNSS rover receiver, or to another location or entity. In one embodiment, for example, the VRS corrected LEO satellite position estimate is transmitted to a terrestrial GNSS rover receiver 860 equipped with a LEO communications receiver, such as an Iridium phone or a radio receiver configured to receive LEO communications channel frequencies.

Consider an embodiment where terrestrial GNSS rover receiver 860 and LEO satellite 100A are used in the "Enge-Talbot method" of computing a location vector between a reference receiver and a GNSS rover receiver 860 (see e.g., U.S. Pat. Nos. 5,944,770 and 5,811,961 to Per Enge et al., both entitled "Method and Receiver Using a Low Earth Orbiting Satellite Signal to Augment the Global Position System"). In such an embodiment, the VRS corrected LEO satellite position estimate provides terrestrial GNSS rover receiver 860 with an improved observable related to LEO satellite 100A, in the form of a very accurate position fix of LEO satellite 100A with respect to a particular time. Receipt of this accurate position fix reduces the solution space and thus the amount of time and computation required for terrestrial GNSS rover receiver 860 to determine an integer number a wavelengths in a LEO carrier signal between terrestrial GNSS rover receiver 860 and LEO satellite 100A at a time associated with the VRS corrected LEO satellite position estimate. This decreases the amount of time and computation required for a GNSS receiver, such as terrestrial GNSS receiver 860, to perform the Enge-Talbot method.

In one embodiment, a first communications path is used for the transmission of the GNSS information message (which includes a position estimate determined by GNSS receiver 105) from LEO satellite 100A to VRS processor 210 for use in generating the VRS corrections. It is appreciated that this first communications path includes appropriate portions of communications subsystem 115, for modulating and transmitting a radio frequency (RF) message comprising the position estimate determined by GNSS receiver 105. In one embodiment the RF message is an RF version of the GNSS information message. This first communications path also comprises a signal path 811 and a communicative coupling 822, and can include utilizing communications path 111 within LEO satellite 100. In one embodiment, this first communications path comprises a telemetry downlink via communications path 111 and signal path 811 between LEO satellite 100A and LEO control station 820. In another embodiment, the first communications path comprises a communications downlink on signal path 811 between LEO satellite 100A and LEO control station 820. The first communications path is completed by the GNSS information message from LEO control station 820 to VRS processor 210 via communicative coupling 822.

In one embodiment, a second communications path is used for the transmission of the VRS corrections message from LEO control station 820 (communicatively coupled with VRS processor 210 in master reference station 200) to LEO satellite 100A. It is appreciated that the second communications path includes appropriate portions of communications subsystem 115, as previously described in conjunction with communications path 112, for receiving and demodulating a radio frequency message comprising the VRS corrections for a position estimate determined by GNSS receiver 105. This second communications path also includes a communicative coupling 822 between master reference station 200 and LEO control station 820, and a signal path 812 between LEO control station 820 and LEO satellite 100A. In one embodiment, signal path 812 comprises a telemetry uplink between LEO control station 820 and LEO satellite 100A. In another embodiment, signal path 813 comprises a communications uplink between LEO control station 820 and LEO satellite 100A.

In one embodiment, as an alternative to the second communications path, the VRS corrections message is transmitted from VRS processor 210 to LEO satellite 100A over a signal path 814 using a commercial transmitter 870 which is communicatively coupled to master reference station 200. It is appreciated that this alternate communications path includes appropriate portions of communications subsystem 115, such as those described in conjunction with communications path 114, for receiving and demodulating a radio frequency message comprising the VRS corrections for a position estimate determined by GNSS receiver 105. In one embodiment, commercial transmitter 870 comprises a device such as a LEO satellite phone (e.g. a handset) and/or modem, and signal path 814 comprises a commercial communications uplink such as a satellite telephone signal uplink.

In one embodiment, a third communications path is used for the communication of the VRS corrected position message (comprising the VRS corrected LEO satellite position estimate) from LEO satellite 100A to GNSS rover receiver. It is appreciated that the third communications path includes appropriate portions of communications subsystem 115 of LEO satellite 100A, as previously described in conjunction with communications path 113, for modulating and transmitting a radio frequency message comprising the VRS corrected LEO satellite position estimate. The third communications path also includes a signal path between LEO satellite 100A and the GNSS rover receiver. In one embodiment, the third communications path utilizes a downlink communications channel of LEO satellite 100A. The GNSS rover receiver can be a terrestrial rover receiver, such as terrestrial GNSS rover receiver 860, or a space borne GNSS rover receiver, such as a GNSS receiver located on another LEO satellite 100. In one embodiment, signal path 813 comprises a communications downlink from LEO satellite 100A to terrestrial GNSS rover receiver 860. In another embodiment, another signal path comprising an intersatellite link conveys the VRS corrected position message (comprising the VRS corrected LEO satellite position estimate) from LEO satellite 100A to another satellite, such as LEO satellite 100B. The other satellite then downlinks the to the terrestrial GNSS rover receiver via a communications channel. It is appreciated that the GNSS rover receiver (e.g., GNSS rover receiver 860) is configured for tuning to a LEO satellite and for receiving and utilizing a VRS corrected position message and/or other information received from a LEO satellite.

It is appreciated that in some embodiments, a VRS corrected position estimate of LEO satellite 100A is transmitted to a GNSS rover receiver, such as terrestrial GNSS rover receiver 860, in exchange for a fee. For example, in one embodiment, an owner or operator or some entity associated with terrestrial GNSS rover receiver 860 is required to pay a fee, such as a subscription, to receive VRS corrected LEO satellite position estimates from LEO satellite(s) 100. In one embodiment, this comprises not transmitting such information to terrestrial GNSS rover receiver 860, or preventing decoding or decryption of such information, unless a fee is paid. In one embodiment, this comprises enabling terrestrial GNSS rover receiver 860 to decode, decrypt, and/or receive such information in the event a fee is paid for delivery of such information.

Figure 8B:
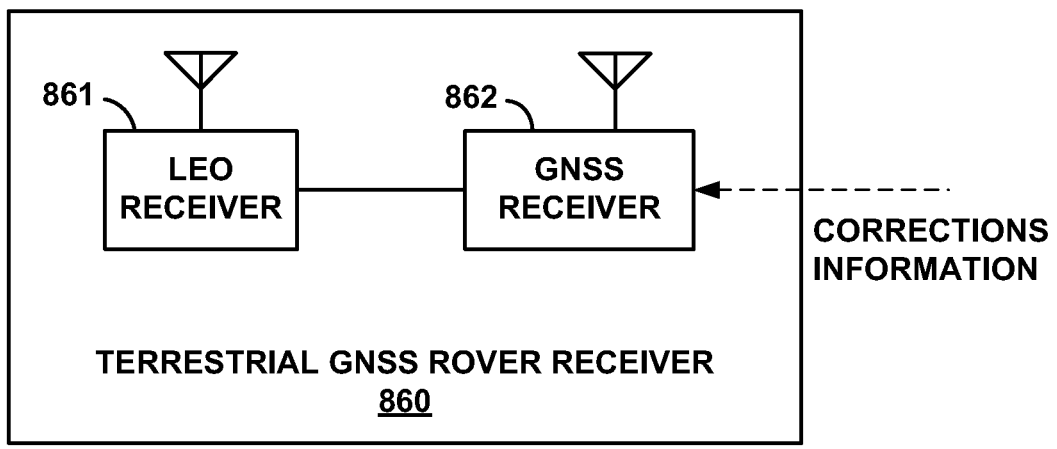
FIG. 8B shows a block diagram of terrestrial GNSS rover receiver, according to an embodiment.

FIG. 8B shows a block diagram of terrestrial GNSS rover receiver 860, according to an embodiment. As shown in FIG. 8B, terrestrial GNSS rover receiver 860 includes a GNSS receiver 862 which is communicatively coupled with a LEO receiver 861. In various embodiments, terrestrial GNSS rover receiver 860 can be fixed or mobile and can be land based, afloat, or airborne. In one embodiment, LEO receiver 861 and GNSS receiver 862 are disposed in a common housing. In another embodiment LEO receiver 861 and GNSS receiver 862 are separate devices that are coupled together such as by a wireless, wired, or optical coupling. For example, as separate devices they can be communicatively coupled with one another by a serial cable.

LEO receiver 861 can comprise any of a number of LEO receivers and/or data modems, depending upon the LEO satellite that communications are to be received from. Additionally, in one embodiment LEO receiver 861 is a transceiver device which enables two-way communication between terrestrial GNSS rover receiver 860 and a LEO satellite, such as LEO satellite 100A. Some examples of devices which can be used as LEO receiver 861 include: an Iridium satellite telephone (e.g. the Motorola Iridium 9505A Portable Satellite Phone which includes a serial data port for communicative coupling with other devices during the tranception of data); an Iridium satellite system compatible modem (e.g., the Iridium 9522A modem, the Iridium 9601 short burst data modem; and the RST600 Beam data modem); a Globalstar satellite phone (e.g., the Qualcomm GSP 1600 and GSP 1700 satellite phones which each include a data port for communicative coupling with other devices during the tranception of data); and a Globalstar compatible modem (e.g., Globalstar Duplex Modem or GSP-1620 Satellite Data Modem). In one embodiment LEO receiver 861 receives a VRS corrected position message from a LEO satellite, such as LEO satellite 100A, and provides the VRS corrected position message (or all or a portion of its contents) to GNSS receiver 862 as an input. LEO satellite receiver 861 can also receive and provide other signals to GNSS receiver 862. For example, in one embodiment signals used by the previously referenced Enge-Talbot method are received and provided to GNSS receiver 862.

GNSS receiver 862 is configured to receive signals from navigation satellites of one or more global satellite navigation systems (e.g., GPS, GLONASS, and the like). GNSS receiver 862 is also configured to receive and utilize LEO satellite position information, such as VRS corrected LEO satellite position estimate received in a VRS corrected position message by LEO satellite receiver 861. Additionally, in some embodiments, GNSS receiver 862 is configured to receive and utilize additional corrections information including differential GPS corrections, RTK corrections, signals used by the previously referenced Enge-Talbot method; and wide area augmentation system (WAAS) corrections, among others). A more detailed example of one implementation of GNSS receiver 862 is illustrated by GNSS receiver 1130 of FIG. 11. Such corrections information may be received from a LEO satellite, or via a terrestrial broadcast, such as from terrestrial communications network 823 shown in FIG. 8A.

It is appreciated that the concept of a terrestrial GNSS receiver which is communicatively coupled to a LEO satellite, has been previously described. For example, the previously reference "Cleave" patent describes a surface telestation with a GPS unit communicatively coupled to with LEO satellite network for sending and receiving data. In one embodiment, GNSS receiver 862 is communicatively coupled to LEO satellite 100A in the manner described in the Cleave patent, and in such manner data is LEO satellite position information is received.

Example Method of Conveying Information
Regarding an Orbit

Figure 9A:
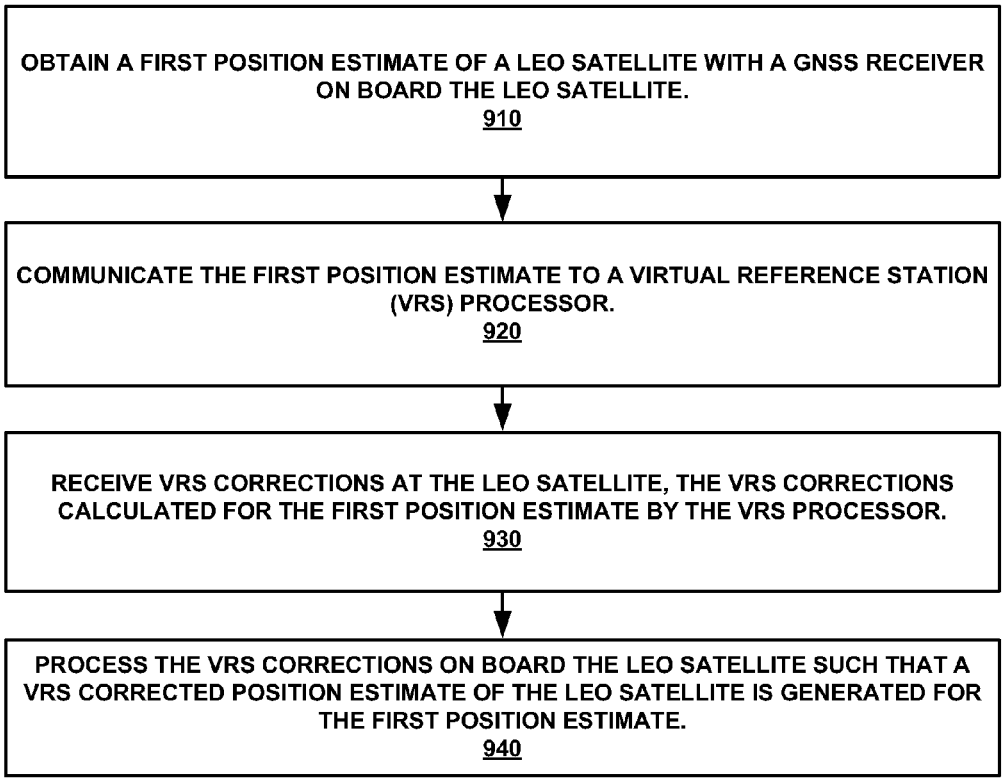
FIG. 9A shows a flow diagram of a method for refining a position estimate of a LEO satellite, in accordance with an embodiment.
Figure 9B:
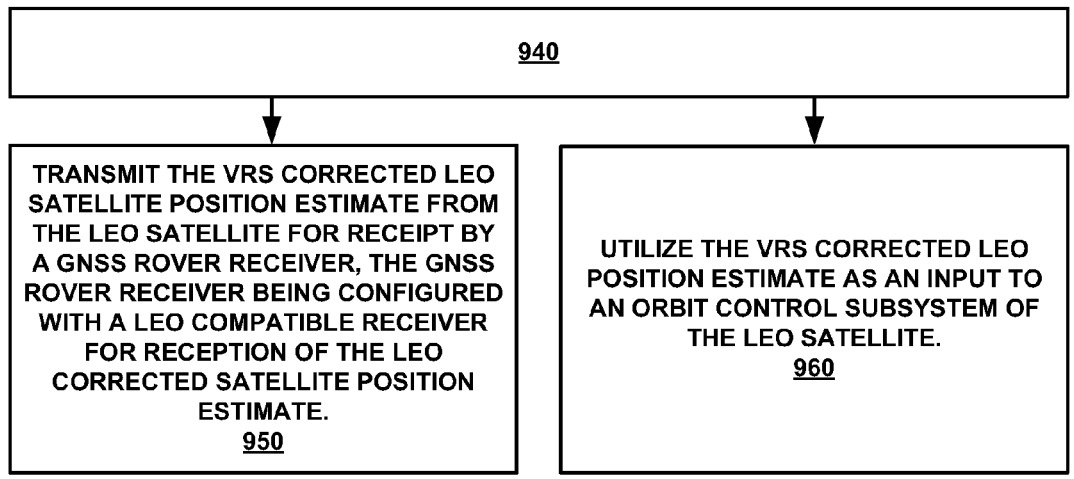
FIG. 9B shows a continuation of the flow diagram of FIG. 9A, in accordance with an embodiment.

With reference to FIG. 9A and FIG. 9B, flow diagram 900 describes steps of a method that is performed using components and/or functions a LEO satellite, such as LEO satellite 100 of FIG. 10, which is equipped with a GNSS receiver. In various embodiments the method of flow diagram 900, is carried out by a processor under the control of computer-readable and computer-executable instructions. Thus, in some embodiments, this method is implemented via a computer or computers, such as computer system 1000 of FIG. 10, which may be used to implement some of the functions and/or components of LEO satellite 100. The computer-readable and computer-executable instructions reside, for example, in computer useable/readable storage media such as volatile memory 1004, non-volatile memory 1006, media of storage device 1018 of computer system 1000 (all shown in FIG. 10), or in/on other well known computer-readable storage media. The computer-readable and computer-executable instructions, which may reside on computer useable/readable storage media, are used to control or operate in conjunction with, for example, processor 1002 of FIG. 10. Although specific steps are disclosed in flow diagram 900, such steps are examples. That is, embodiments are well suited to performing various other steps or variations of the steps recited. It is appreciated that the steps in flow diagram 900 may be performed in an order different than presented, and that not all of the steps in flow diagram 900 may be performed.

FIGS. 9A and 9B illustrate a flow diagram 900 of an example method for refining a position estimate of a low earth orbiting (LEO) satellite, in accordance with one embodiment. This method may be may be performed by a LEO satellite, such as a LEO satellite 100 described herein. For purposes of example, and not of limitation, operation of the method of flow diagram 900 is described with reference to components and functionality LEO satellite 100 of FIG. 1, LEO satellite 100A of FIG. 8A, master reference station 200 of FIG. 2, and with reference to elements of positioning and navigation system 800 of FIG. 8A.

At 910 of flow diagram 900, in one embodiment, the method obtains a first position estimate of a LEO satellite with a GNSS receiver on-board the LEO satellite. For example, with reference to FIG. 8A, this comprises receiving signals from a plurality of GNSS satellites 850. These signals comprise GNSS observables which are measured by GNSS receiver 105 of LEO satellite 100A. Following this example, GNSS receiver 105 uses the signals from a plurality of GNSS satellites 850 to generate and provide a first position estimate which represents an approximate position of LEO satellite

100A. This first position estimate is, in one embodiment, an uncorrected initial position fix at a particular time, T(i).

At 920 of flow diagram 900, in one embodiment, the method communicates the first position estimate to a Virtual Reference Station (VRS) processor. Following the previous example, in one embodiment, this comprises GNSS receiver 105 forwarding the first position estimate to GNSS information formatter 110. GNSS information formatter 110 formats that first position estimate into a GNSS information message which can be communicated to a VRS processor via communications subsystem 115. In some embodiments, such formatting additionally comprises including a time tag indicating a time, T(i), of measurement of the first position estimate; an identifier associated with the LEO satellite; and/or formatting one or more of the raw observables measured or calculated by GNSS receiver 105 into a transmittable GNSS information message. After formatting, GNSS information formatter 110 provides the GNSS information message to communications subsystem 115. In communications subsystem 115, RF subsystem 120 modulates the GNSS information message for transmission by antenna subsystem 130. The GNSS information message, which includes the first position estimate, can be transmitted to a VRS processor via an intersatellite link, a communications link, and/or a telemetry link. For example, after transmission, such as via a telemetry link, the GNSS information message is received at a ground station, demodulated and/or decoded as required, and communicatively coupled to a VRS processor. In some embodiments, after corrections have been received for time T(i) an additional GNSS information message is also communicated which includes a VRS corrected LEO satellite position estimate that has been calculated within the LEO satellite using the received corrections.

Consider an embodiment where the first position estimate is transmitted to a VRS processor using a telemetry downlink to transmit GNSS information message from the LEO satellite. In one such embodiment, the first position estimate is routed through satellite LEO satellite 100A via communications path 111. For example, the GNSS information formatter receives the first position estimate and formats a GNSS information message. The GNSS information message is then modulated within RF subsystem by telemetry module 122. Antenna subsystem 130 then transmits the modulated GNSS information message on an outgoing telemetry downlink channel, which can include transmitting the message via an antenna dedicated to that telemetry downlink channel. For purposes of example and not of limitation, this transmission is represented by signal path 811. In one embodiment, such a transmission is directed to LEO control station 820, which, after receipt, demodulates the GNSS information message and forwards it via communicative coupling 822 to VRS processor 210 of master deference station 200.

In the manner previously described above, master reference station 200 produces VRS corrections associated with the first position estimate received from LEO satellite 100A. The VRS corrections are then transmitted back to LEO satellite 100A. For example, the VRS corrections can be formatted into a VRS corrections message and communicated from master reference station 200 to LEO control station 820, via communicative coupling 822. The VRS corrections message is then modulated and/or encoded and transmitted from LEO control station 820 back to LEO satellite 100A. In one embodiment, LEO control station 820 transmits the VRS corrections message directly to LEO satellite 100A for receipt on a communications uplink channel or a telemetry uplink channel of LEO satellite 100A. For purposes of example, and not of limitation, such a transmission is represented by signal path 812. In another embodiment LEO control station 820 transmits the VRS corrections message indirectly to LEO satellite 100A. For example, LEO control station 820 can transmit the VRS corrections message to LEO satellite 100B, which can then retransmit the message on an intersatellite crosslink channel to LEO satellite 100A.

At 930 of flow diagram 900, in one embodiment, the method receives VRS corrections at the LEO satellite. It is appreciated that the VRS corrections have been calculated for the first position estimate by the previously described VRS processor. As described, the VRS corrections can be received on an intersatellite crosslink channel, a communications uplink channel, and/or a telemetry uplink channel depending upon how they were transmitted. Consider an example embodiment where the VRS corrections are received on a telemetry uplink channel of LEO satellite 100A. In one such embodiment, a transmission signal comprising a VRS corrections message is received on a telemetry uplink channel by antenna subsystem 130. The signal is provided to telemetry module 122, which demodulates it into a VRS corrections message. Telemetry module 122 provides the VRS corrections message to corrections message decoder 140, which performs any necessary decoding to produce VRS corrections. Corrections message decoder 140 then provides the VRS corrections to corrections processor 150.

At 940 of flow diagram 900, in one embodiment, the method processes the VRS corrections on-board the LEO satellite such that a VRS corrected LEO satellite position estimate of the LEO satellite is generated for the first position estimate. Following the previous example, regardless of the means of receipt, received VRS corrections are provided to corrections processor 150 which processes the corrections to correct for errors, such as errors in observables measured by GNSS receiver 105. The result of the processing is a VRS corrected LEO satellite position estimate for the time and location that the approximate position of LEO satellite 100A was determined by GNSS receiver 105.

At 950 of flow diagram 900, in one embodiment, the method transmits the VRS corrected LEO satellite position estimate from LEO satellite 100A for receipt by a GNSS rover receiver. In one such embodiment, corrections processor 150 provides the VRS corrected LEO satellite position estimate of LEO satellite 100A to VRS corrected position formatter 170. VRS corrected position formatter 170 formats the VRS corrected LEO satellite position estimate into a VRS corrected position message, which is provided to communications module 124. In one embodiment this formatting comprises including a time tag which indicates a time that the VRS corrected LEO satellite position is associated with. Communications module 124 modulates the VRS corrected position message for transmission on a communications channel by antenna subsystem 130. Antenna subsystem 130 then transmits the VRS corrected position message over the communications channel. For purposes of example, and not of limitation, such a transmission is represented by signal path 813.

At 960 of flow diagram 900, in one embodiment, the method utilizes the VRS corrected LEO satellite position estimate as input to an orbital control subsystem of the LEO satellite. In one embodiment, this comprises corrections processor 150 providing the VRS corrected LEO satellite position estimate to orbit control subsystem 160, which then performs orbit control of LEO satellite 100A based upon one or more VRS corrected LEO satellite position estimates and a desired orbit for LEO satellite 100A. Some examples of orbit control include maneuvering and station keeping.

It is appreciated that communicating a VRS corrected LEO satellite position estimate to a terrestrial user/entity can be advantageous in many situations. One reason for doing this is that the GNSS rover receiver can use the very accurate VRS corrected LEO satellite position estimate as an extra point of information in a position determining algorithm used by the GNSS rover receiver. Consider an embodiment where LEO satellite 100A transmits the VRS corrected LEO satellite position estimate over a communications channel of the LEO satellite for receipt by a terrestrial GNSS rover receiver, such as terrestrial GNSS rover receiver 860. As previously described, this enables a recipient terrestrial GNSS rover receiver to more expeditiously implement the Enge-Talbot method of augmenting the Global Positioning System. Also, as previously described, such information can be communicated to a terrestrial GNSS rover receiver in exchange for a fee.

In remote locations such as the South Pole, the North Atlantic, and many wide ocean and land expanses, there are not a large number of reference stations which can be used as input sources to a VRS process. Thus, incorporating a LEO satellite position estimate and/or observables into a VRS process can result in an appreciable increase in resolution of a VRS position in such remote locations. Providing a VRS corrected LEO satellite position to a terrestrial GNSS rover receiver in such a remote location can also provide an additional reference source which can be used to refine a position determined by the terrestrial GNSS rover receiver. For example, a series of VRS corrected LEO satellite position estimates can be used in near real time as inputs from a moving reference station, in order to adjust position estimates of a terrestrial GNSS rover receiver, such as terrestrial GNSS rover receiver 860 shown in FIG. 8A. By near real time, what is meant is that the VRS corrected LEO satellite position estimates are received at a terrestrial GNSS rover receiver with a slight delay (e.g., approximately 0.1 seconds to 10 seconds) from the time they are calculated for. This delay is due to processing time and transit time. Thus, as terrestrial GNSS rover receiver 860 receives VRS corrected LEO satellite position estimates in near real time, associated time tags can be used to provide adjustments in arrears to position estimates determined by terrestrial GNSS rover receiver 860 at the time(s) represented by the received time tag(s). Consider an example where, at time T(3), terrestrial GNSS rover receiver 860 receives a VRS corrected LEO satellite position for time T(i). Terrestrial GNSS rover receiver 860 then makes corrections in arrears for the position estimate that it determined at time T(i).

In a similar fashion, incorporating a LEO satellite position estimate and/or observables into VRS corrections for a terrestrial GNSS rover receiver beneath the mission area of a LEO satellite allows an extra reference location to be used in calculation of such VRS corrections. This may result in a minor improvement to the corrections when a large number of reference stations are used as inputs. However, in remote locations such as the South Pole, the North Atlantic, and many wide ocean and land expanses, incorporating a LEO satellite position estimate and/or observables into a VRS process which would otherwise have very few reference stations as inputs can result in a more appreciable increase in resolution of a VRS position.

Example Computer System Environment

With reference now to FIG. 10, a block diagram is shown of an embodiment of an example computer system 1000 which may be used in accordance with various embodiments described herein. It should be appreciated that computer system 1000 is not strictly limited to being a computer system. As such, computer system 1000 of the present embodiment may be well suited to be any type of computing device such as, a computing device utilized to perform calculations, processes, operations, and functions within a GNSS receiver such as GNSS receiver 105 of FIG. 1, or within a LEO satellite such as LEO satellite 100, or within a master reference station, such as master reference station 200 of FIG. 2. Within the discussions herein, certain processes and steps are discussed that are realized, in one embodiment, as a series of instructions (e.g., software program) that reside within computer readable memory and are executed by a processor(s) of computer system 1000. When executed, the instructions cause computer system 1000 to perform specific actions and exhibit specific behavior that may be described in detail herein.

Computer system 1000 of FIG. 10 comprises an address/data bus 1010 for communicating information, one or more central processors 1002 coupled with bus 1010 for processing information and instructions. Central processor unit(s) 1002 may be a microprocessor or any other type of processor. Computer system 1000 also includes data storage features such as a computer usable volatile memory 1004 (e.g., random access memory, static RAM, dynamic RAM, etc.) coupled with bus 1010 for storing information and instructions for central processor(s) 1002, a computer usable non-volatile memory 1006 (e.g., read only memory, programmable ROM, flash memory, EPROM (erasable programmable read only memory), EEPROM (electrically erasable programmable read only memory), etc.) coupled with bus 1010 for storing static information and instructions for processor(s) 1002.

Computer system 1000 also includes one or more signal generating and receiving device(s) 1008 coupled with bus 1010 for enabling computer system 1000 to interface with other electronic devices and computer systems. Signal generating and receiving device(s) 1008 of the present embodiment may include wired serial adaptors, modems, and network adaptors, wireless modems, and wireless network adaptors, and other such communication technology. The signal generating and receiving device(s) 1008 may work in conjunction with one or more communication interface(s) 1022 for coupling information to and/or from computer system 1000. Communication interface 1022 may include a serial port, parallel port, Universal Serial Bus (USB), Ethernet port, antenna, or other input/output interface. Communication interface 1022 may physically, electrically, optically, or wirelessly (e.g. via radio frequency) couple computer system 1000 with another device, such as a cellular telephone, radio, or computer system.

In some embodiments, such as in GNSS rover receivers, communication interface 1022 receives additional inputs for use in refining position information determined that is determined by processor 1002. For example, in one embodiment LEO satellite position information, such as information regarding a VRS corrected LEO satellite position estimate, is received and used as an input. Such LEO satellite position information is received in one embodiment via a coupling to a LEO satellite receiver. Additionally, in some embodiments, corrections information is received and coupled to processor 1002 for use in refining a position determination. Such corrections information can include differential GPS corrections, RTK corrections, signals used by the previously referenced Enge-Talbot method; and wide area augmentation system (WAAS) corrections.

Optionally, computer system 1000 may include an alphanumeric input device 1014 including alphanumeric and function keys coupled to the bus 1010 for communicating information and command selections to the central processor(s) 1002. Computer system 1000 can include an optional cursor control or cursor directing device 1016 coupled to the bus 1010 for communicating user input information and command selections to the central processor(s) 1002. The cursor directing device 1016 may be implemented using a number of well-known devices such as a mouse, a track-ball, a trackpad, an optical tracking device, and a touch screen, among others. Alternatively, it is appreciated that a cursor may be directed and/or activated via input from the alphanumeric input device 1014 using special keys and key sequence commands. The present embodiment is also well suited to directing a cursor by other means such as, for example, voice commands.

Computer system 1000 of FIG. 10 may also include one or more optional computer usable data storage devices 1018 such as a magnetic or optical disk and disk drive (e.g., hard drive, floppy diskette, Compact Disk-Read Only Memory (CD-ROM), Digital Versatile Disk (DVD)) coupled with bus 1010 for storing information and/or computer executable instructions. An optional display device 1012 may be coupled to bus 1010 of computer system 1000 for displaying video and/or graphics. It should be appreciated that optional display device 1012 may be a cathode ray tube (CRT), flat panel liquid crystal display (LCD), field emission display (FED), plasma display or any other display device suitable for displaying video and/or graphic images and alphanumeric characters recognizable to a user. In one embodiment, a real time clock 1020 is incorporated in computer system 1000. For example, real time clock 1020 is used in conjunction with an orbit for a GNSS satellite to assist computer system 1000 in quickly determining the proper frequency to tune to in order to receive information being broadcast from the GNSS satellite.

Example GNSS Receiver

Figure 11:
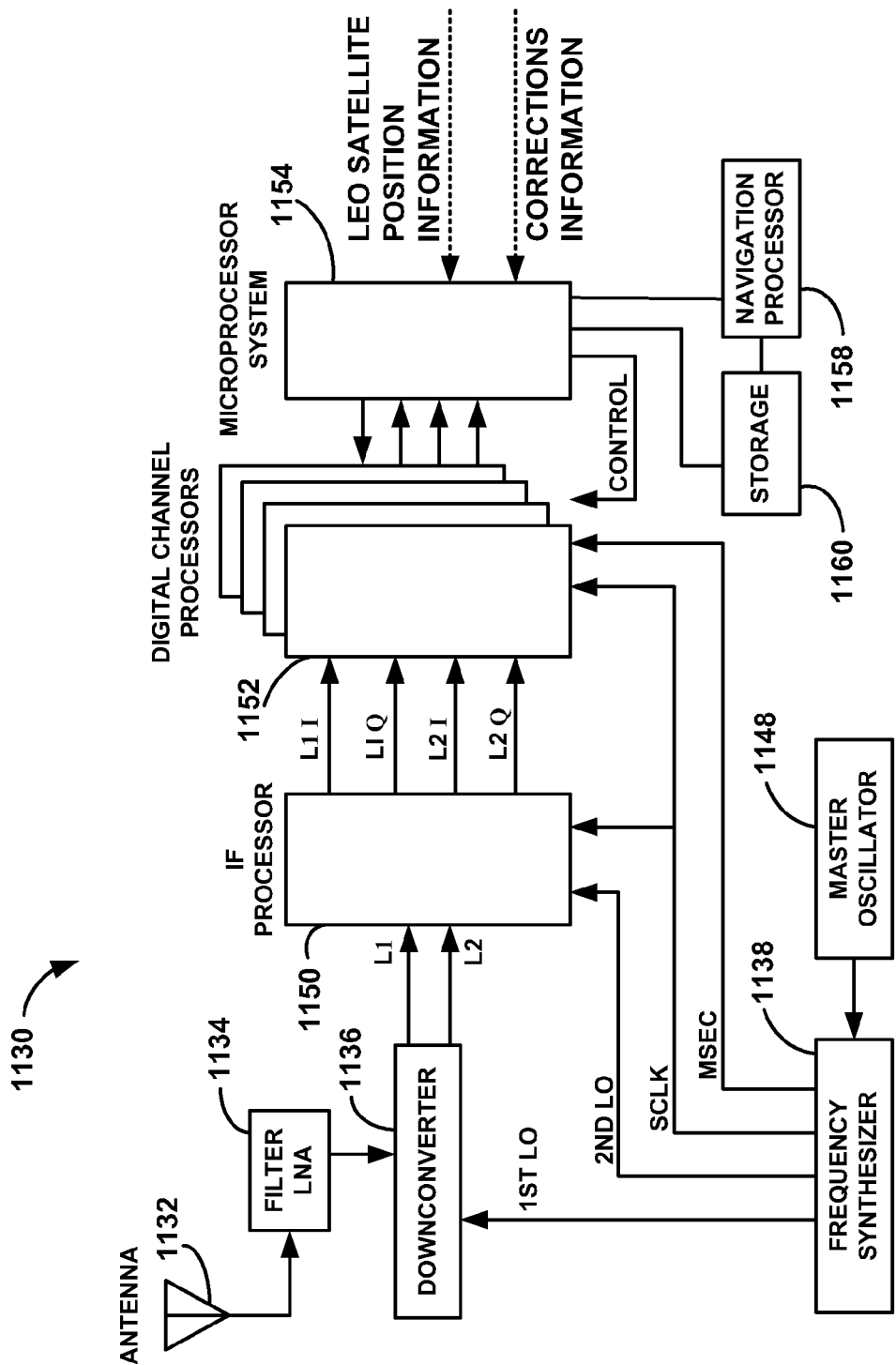
FIG. 11 shows an example GNSS receiver used in accordance with some embodiments.

With reference now to FIG. 11, a block diagram is shown of an embodiment of an example GNSS receiver which may be used in accordance with various embodiments described herein. In particular, FIG. 11 illustrates a block diagram of a GNSS receiver in the form of a general purpose GPS receiver 1130 capable of demodulation of the L1 and/or L2 signal(s) received from one or more GPS satellites. A more detailed discussion of the function of a receiver such as GPS receiver 1130 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 1130 of FIG. 11.

In FIG. 11, received L1 and L2 signals are generated by at least one GPS satellite. Each GPS satellite generates different signal L1 and L2 signals and they are processed by different digital channel processors 1152 which operate in the same way as one another. FIG. 11 shows GPS signals (L1=1575.42 MHz, L2=1227.60 MHz) entering GPS receiver 1130 through a dual frequency antenna 1132. Antenna 1132 may be a magnetically mountable model commercially available from Trimble Navigation of Sunnyvale, Calif. Master oscillator 1148 provides the reference oscillator which drives all other clocks in the system. Frequency synthesizer 1138 takes the output of master oscillator 1148 and generates important clock and local oscillator frequencies used throughout the system. For example, in one embodiment frequency synthesizer 1138 generates several timing signals such as a 1st (local oscillator) signal LO1 at 1400 MHz, a 2nd local oscillator signal LO2 at 175 MHz, an SCLK (sampling clock) signal at 25 MHz, and a MSEC (millisecond) signal used by the system as a measurement of local reference time.

A filter/LNA (Low Noise Amplifier) 1134 performs filtering and low noise amplification of both L1 and L2 signals. The noise figure of GPS receiver 1130 is dictated by the performance of the filter/LNA combination. The downconvertor 1136 mixes both L1 and L2 signals in frequency down to approximately 175 MHz and outputs the analogue L1 and L2 signals into an IF (intermediate frequency) processor 1150. IF processor 1150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 1152 inputs the digitally sampled L1 and L2 inphase and quadrature signals. All digital channel processors 1152 are typically are identical by design and typically operate on identical input samples. Each digital channel processor 1152 is designed to digitally track the L1 and L2 signals produced by one satellite by tracking code and carrier signals and to from code and carrier phase measurements in conjunction with the microprocessor system 1154. One digital channel processor 1152 is capable of tracking one satellite in both L1 and L2 channels. Microprocessor system 1154 is a general purpose computing device (such as computer system 1000 of FIG. 10) which facilitates tracking and measurements processes, providing pseudorange and carrier phase measurements for a navigation processor 1158. In one embodiment, microprocessor system 1154 provides signals to control the operation of one or more digital channel processors 1152. Navigation processor 1158 performs the higher level function of combining measurements in such a way as to produce position, velocity and time information for the differential and surveying functions. Storage 1160 is coupled with navigation processor 1158 and microprocessor system 1154. It is appreciated that storage 1160 may comprise a volatile or non-volatile storage such as a RAM or ROM, or some other computer readable memory device or storage media. In one rover receiver embodiment, navigation processor 1158 performs one or more of the methods of position correction described herein. For example, in one rover receiver embodiment, navigation processor 1158 utilizes a received VRS corrected LEO satellite position to refine a position determined by GPS receiver 1130.

In some embodiments, such as in rover receivers, microprocessor 1154 and/or navigation processor 1158 receive additional inputs for use in refining position information determined by GPS receiver 1130. For example, in one embodiment LEO satellite position information, such as information regarding a VRS corrected LEO satellite position estimate, is received and used as an input. Such LEO satellite position information is received in one embodiment via a coupling to a LEO satellite receiver. Additionally, in some embodiments, corrections information is received and utilized. Such corrections information can include differential GPS corrections, RTK corrections, signals used by the previously referenced Enge-Talbot method; and wide area augmentation system (WAAS) corrections.

Various example embodiments of the subject matter are thus described. While the subject matter has been described in particular embodiments, it should be appreciated that the subject matter should not be construed as limited by such embodiments, but rather construed according to the following claims. Moreover, while the technology, methods and techniques described above are described with reference to LEO satellites, it is appreciated that they are also generally applicable to satellites in other orbits such as satellites in medium earth orbit or satellites in highly elliptical earth orbit.

What is claimed is:

1. A method for refining a position estimate of a low earth orbiting (LEO) satellite:
   obtaining a first position estimate of a LEO satellite with a GNSS receiver on-board said LEO satellite;
   communicating said first position estimate to a Virtual Reference Station (VRS) processor;
   receiving VRS corrections at said LEO satellite, said VRS corrections calculated for said first position estimate by said VRS processor; and
   processing said VRS corrections on-board said LEO satellite such that a VRS corrected LEO satellite position estimate of said LEO satellite is generated for said first position estimate.

2. The method as recited in claim 1, wherein said communicating said first position estimate to a VRS processor comprises:
   transmitting said first position estimate using a telemetry downlink to communicate said first position estimate from said LEO satellite, wherein said downlink is further coupled to a communications network configured for delivering said first position estimate to said VRS processor.

3. The method as recited in claim 1, wherein said communicating said first position estimate to a VRS processor comprises:
   formatting said first position estimate into a GNSS information message along with an identifier associated with said LEO satellite; and
   communicating said GNSS information message to said VRS processor.

4. The method as recited in claim 1, wherein said receiving VRS corrections at said LEO satellite comprises:
   receiving said VRS corrections utilizing a telemetry uplink of said LEO satellite, wherein said telemetry uplink is communicatively coupled with said VRS processor.

5. The method as recited in claim 1, wherein said processing said VRS corrections on-board said LEO satellite such that a VRS corrected LEO satellite position estimate of said LEO satellite is generated for said first position estimate comprises:
   processing said VRS corrections to correct for errors in GNSS observables measured by said GNSS receiver.

6. The method as recited in claim 1, further comprising:
   transmitting said VRS corrected LEO satellite position estimate from said LEO satellite for receipt by a GNSS rover receiver.

7. The method as recited in claim 6, wherein said transmitting said VRS corrected LEO satellite position estimate from said LEO satellite for receipt by a GNSS rover receiver comprises:
   transmitting said VRS corrected LEO satellite position estimate over a communications channel of said LEO satellite for receipt by a terrestrial GNSS rover receiver, said GNSS rover receiver being configured with a LEO compatible receiver for reception of said LEO corrected satellite position estimate.

8. The method as recited in claim 1, further comprising:
   utilizing said VRS corrected LEO position estimate as an input to an orbit control system of said LEO satellite.

\* \* \* \* \*